(12) United States Patent
Weston et al.

(10) Patent No.: US 10,226,840 B2
(45) Date of Patent: Mar. 12, 2019

(54) METHOD OF FORMING AN OPTICAL DEVICE

(75) Inventors: Nicholas John Weston, Peebles (GB); Duncan Paul Hand, Edinburgh (GB); Stephanie Giet, Edinburgh (GB); Marcus Ardron, Edinburgh (GB)

(73) Assignee: RENISHAW PLC, Wotton-under-Edge (GB)

( * ) Notice: Subject to any disclaimer, the term of this patent is extended or adjusted under 35 U.S.C. 154(b) by 824 days.

(21) Appl. No.: 13/824,883

(22) PCT Filed: Sep. 26, 2011

(86) PCT No.: PCT/GB2011/001393
§ 371 (c)(1),
(2), (4) Date: Mar. 18, 2013

(87) PCT Pub. No.: WO2012/038707
PCT Pub. Date: Mar. 29, 2012

(65) Prior Publication Data
US 2013/0180959 A1    Jul. 18, 2013

(30) Foreign Application Priority Data

Sep. 24, 2010    (GB) .................................. 1016046.3

(51) Int. Cl.
*B23K 26/00*    (2014.01)
*B23K 26/354*    (2014.01)
(Continued)

(52) U.S. Cl.
CPC ........ *B23K 26/354* (2015.10); *B23K 26/0006* (2013.01); *B23K 26/126* (2013.01);
(Continued)

(58) Field of Classification Search
CPC ............. B23K 26/0078; B23K 26/126; B23K 26/0051; B23K 26/0081; B23K 26/364;
(Continued)

(56) References Cited

U.S. PATENT DOCUMENTS 5,502,292 A * 3/1996 Pernicka ................ B23K 26/24
                                                                    219/121.63
5,907,144 A * 5/1999 Poon ...................... G06K 1/126
                                                                    235/454

(Continued)

FOREIGN PATENT DOCUMENTS

CN         1873377 A        6/2006
CN       101133365 A        2/2008
(Continued)

OTHER PUBLICATIONS

University of Florida. Surface Tension, [retrieved on Dec. 12, 2017]. Retrieved from the Internet <URL: http://fsz.ifas.ufl.edu/surfacetensionandcapillarity/html/en_tension.htm>.*

(Continued)

*Primary Examiner* — Jimmy Chou
(74) *Attorney, Agent, or Firm* — Oliff PLC

(57) ABSTRACT

A method of forming an optical device comprises applying a laser beam to a target area of the surface so as to selectively heat material of the surface thereby to provide transfer of material due to a surface tension gradient, wherein the surface is such that, when liquid, parts of the surface at higher temperatures have a higher surface tension than adjacent parts of the surface at lower temperatures.

38 Claims, 7 Drawing Sheets

(51) Int. Cl.
*B23K 26/12* (2014.01)
*G01D 5/347* (2006.01)
*B23K 26/364* (2014.01)
*B23K 26/40* (2014.01)
*B23K 26/352* (2014.01)
*B23K 101/34* (2006.01)
*B23K 103/04* (2006.01)
*B23K 103/08* (2006.01)
*B23K 103/18* (2006.01)
*B23K 103/00* (2006.01)

(52) U.S. Cl.
CPC ........ *B23K 26/3584* (2018.08); *B23K 26/364* (2015.10); *B23K 26/40* (2013.01); *G01D 5/34707* (2013.01); *B23K 2101/35* (2018.08); *B23K 2103/05* (2018.08); *B23K 2103/08* (2018.08); *B23K 2103/26* (2018.08); *B23K 2103/42* (2018.08); *B23K 2103/50* (2018.08)

(58) Field of Classification Search
CPC .. B23K 26/402; B23K 26/40; B23K 26/0006; B23K 2201/34; B23K 2203/08; B23K 2203/50; B23K 2203/42; G01D 5/34707
USPC ............... 219/121.61, 121.64, 121.65, 12.66
See application file for complete search history.

(56) References Cited

U.S. PATENT DOCUMENTS

| | | | | |
|---|---|---|---|---|
| 6,215,093 | B1* | 4/2001 | Meiners | B22F 3/1055 219/121.61 |
| 7,615,721 | B2* | 11/2009 | Fukuyo | B23K 26/0057 219/121.61 |
| 7,723,640 | B2* | 5/2010 | Caldwell | B29C 66/43 219/121.61 |
| 8,084,707 | B2* | 12/2011 | Omoto | B23K 26/0738 219/121.6 |
| 8,593,727 | B2* | 11/2013 | Kozlov | B23K 26/0063 219/121.6 |
| 2001/0029089 | A1* | 10/2001 | Tanaka | B23K 26/0604 438/479 |
| 2006/0000812 | A1* | 1/2006 | Weber | B29C 65/1654 219/121.61 |
| 2006/0213874 | A1* | 9/2006 | Wada | B23K 9/173 219/74 |
| 2007/0034610 | A1* | 2/2007 | Ochiai | B23K 9/167 219/75 |
| 2007/0240325 | A1 | 10/2007 | Pelsue et al. | |
| 2008/0264910 | A1* | 10/2008 | Kashyap | B23K 26/0613 219/121.61 |
| 2008/0272098 | A1* | 11/2008 | Matz | B23K 1/00 219/129 |
| 2010/0025381 | A1* | 2/2010 | Ammann | B23K 1/19 219/74 |
| 2011/0017712 | A1* | 1/2011 | Wada | B23K 9/16 219/121.46 |

FOREIGN PATENT DOCUMENTS

| | | |
|---|---|---|
| DE | 10 2008 041 562 A1 | 3/2010 |
| EP | 0626228 A1 | 11/1994 |
| EP | 0 690 028 A1 | 1/1996 |
| GB | 1 250 610 | 10/1971 |
| JP | H07-148584 A | 6/1995 |
| JP | H08-11224 A | 1/1996 |
| JP | H10-253801 A | 9/1998 |
| JP | H11-216578 A | 8/1999 |
| JP | A-2002-96187 | 4/2002 |
| WO | WO 2006/078073 A1 | 7/2006 |
| WO | WO 2006/120440 A1 | 11/2006 |

OTHER PUBLICATIONS

Office Action issued in Chinese Patent Application No. 201180050837.1 dated May 23, 2014 (with translation).
October 6, 2015 Office Action issued in Japanese Application No. 2013-529702.
Rastopov, S.F. et al., "Use of the laser-induced Marangoni effect for recording of diffraction gratings," *Sov. J. Quantum Electron*, Aug. 1987, pp. 1091-1092, vol. 17, No. 8.
Su, Y. et al., "Equation to estimate the surface tensions of stainless steels," *Journal of Materials Science*, 2005, pp. 2201-2205, vol. 40.
Li, Z. et al., "Determination of the surface tension of liquid stainless steel," *Journal of Materials Science*, 2005, pp. 2191-2195, vol. 40.
Balandin, V. Yu. et al., "Thermocapillary flow excited by focused nanosecond laser pulses in contaminated thin liquid iron films," *Journal of Applied Physics*, Aug. 1, 1995, pp. 2037-2044, vol. 78, No. 3.
Chen, S.C. et al., "Melting and Surface Deformation in Pulsed Laser Surface Micromodification of Ni-P Disks," *Journal of Heat Transfer*, Feb. 2000, pp. 107-112, vol. 122.
Bennett, T.D. et al., "Marangoni Mechanism in Pulsed Laser Texturing of Magnetic Disk Substrates," *Journal of Heat Transfer*, Aug. 1997, pp. 589-596, vol. 119.
Grant, I. et al., "Welding 304L Stainless Steel Tubing Having Variable Penetration Characteristics," *Welding in Energy-Related Projects*, pp. 247-258.
Mills, K.C. et al., "Marangoni Effects in Welding," *Philosophical Transactions: Mathematical, Physical and Engineering Sciences*, Apr. 15, 1998, pp. 911-925, vol. 356, No. 1739.
Giet, S. et al., "YAGboss-laser micro-sculpting of metal surfaces for the manufacture of high precision optical encoder scale," pp. 1-7.
Nagels, E. et al., "The influence of sulphur content on the quality of laser cutting of steel," *Journal of Materials Processing Technology*, 2007, pp. 159-162, vol. 194.
Chen, Shang-Liang, "The effects of gas composition on the $CO_2$ laser cutting of mild steel," *Journal of Materials Processing Technology*, 1998, pp. 147-159, vol. 73.
Zaeh, M.F. et al., "Influence of $CO_2$ in the Ar Process-Gas on the Heat-Conduction Mode Laser Beam Welding Process with Nd:YAG and Diode Lasers," *Proceedings of the Fifth International WLT-Conference on Lasers in Manufacturing 2009*, Jun. 2009, pp. 45-51.
British Search Report issued in British Application No. GB1016046.3 dated Feb. 17, 2011.
International Search Report issued in International Application No. PCT/GB2011/001393 dated Feb. 10, 2012.
Written Opinion of the International Searching Authority issued in International Application No. PCT/GB2011/001393 dated Feb. 10, 2012.
Jul. 19, 2016 Office Action issued in Japanese Application No. 2013-529702.
Dec. 22, 2017 Office Action issued in European Application No. 11 773 110.9.
May 30, 2018 Office Action issued in Indian Patent Application No. 2653/DELNP/2013.
Sep. 20, 2018 Office Action issued in European Application No. 11773110.9.

* cited by examiner

METHOD OF FORMING AN OPTICAL DEVICE

FIELD OF THE INVENTION

The present invention relates to the formation of optical devices, for example the formation of optical devices by application of a laser beam to a surface to alter the optical properties of the surface.

The invention has particular application to, but is not limited to, the production of phase scale devices or other metrological devices.

BACKGROUND TO THE INVENTION

Many different techniques for producing optical devices on a surface are known. For example, there are various well known techniques for producing metrological scales, for example phase scales or amplitude scales.

Amplitude scales usually comprise a surface that includes features that determine the amplitude of light that, in operation, is received by a readhead from the scale. For example, a reflective amplitude scale can include a sequence of reflective and non-reflective lines formed at accurately determined positions on the surface. As the readhead is moved over the surface it can determine its position accurately based on the location and number of the reflective and non-reflective lines. In general, although the transverse position of the reflective and non-reflective lines on the surface must be determined accurately, the vertical profile of the reflective and non-reflective lines above the surface is of secondary significance for an amplitude scale device. A variety of techniques can be used to produce amplitude scale devices.

Phase scales have a sequence of marks distributed over a surface, with each mark having an accurately determined height, and being formed to provide wells of accurately determined depth between each mark. In operation, light applied by a readhead reflects both from the top of each mark and from the wells between marks, and the readhead is able to detect either constructive or destructive interference of reflected light, using known techniques. Typically, the marks are formed to provide a rectangular wave shaped structure on the surface, with the depth of the wells between marks usually being equal to half a wavelength of the light applied by the readhead. Variations in the height of the marks, or the depths of the wells, or the presence of significant roughness on the surface can cause a significant worsening in signal to noise ratios that are obtainable by readhead measurements on the phase scale. Therefore, phase scales are typically formed using photolithography techniques which, whilst they can be time consuming, are able to provide surface features of sufficient resolution.

It has been suggested to use laser ablation techniques to remove significant quantities of material from a surface to form phase scale features. However such laser ablation techniques can result in the wells having rough surfaces, affecting their reflectivity and increasing signal to noise ratio. Furthermore, if significant quantities of material are ablated from the surface it has been found that some of the material can settle elsewhere on the surface and thus interfere with operation of the phase scale.

An alternative method of forming a phase scale device has been described in WO 2006/120440 in the name of the present applicant. According to that method, a laser beam of suitable intensity is applied to a scale substrate and causes the softening and displacement of substrate material away from the focal point of the laser beam, without substantial removal of material. The action of the laser beam does not degrade the reflectivity, with each point on the scale remaining reflective and without substantial roughening. The beam is applied repeatedly at different locations across the substrate to build up a phase scale device having a desired profile. The resulting profile has marks and wells with rounded edges, but it was found that despite having such a rounded, rather than square wave, profile the resulting device could still function satisfactorily as a phase scale device. The process described in WO 2006/120440 can be more rapid and efficient, and cheaper to implement, than photolithographic techniques.

The application of a laser beam to a surface to move material to form an optical device having a desired profile is described in S F Rastopov and A T Sukhodol'skiĭ, 1987 Sov. J. Quantum Electron. Vol 17, 1091. The method described in that document was used to form a diffraction grating. A thin liquid layer of a binary liquid solution was provided on a surface, and laser radiation was applied, which caused local evaporation of volatiles from the solution driven by local heating, which in turn caused mass transfer that caused the formation of a surface profile of material. The laser radiation was applied repeatedly to build up a desired profile forming a diffraction grating structure. The mass transfer was attributed to the Marangoni effect (also variously called the Gibbs-Marangoni effect, Marangoni convection and thermocapillary convection), which is a physical phenomenon whereby a surface tension gradient at the interface between two fluids causes mass transfer.

U.S. Pat. No. 5,907,144 describes the use of thermocapillary or surface tension forces caused by application of a pulsed laser beam to a metal surface on the edge of a magnetic disk, to cause the flow of metal away from the irradiated area. The laser beam is applied at different locations to form a curved reflector that comprises a bar code structure.

The welding literature describes methods for manipulating the profile of work pieces, including causing the sculpting of material by suitable application of laser radiation under controlled conditions. It is known from welding literature that surface tension gradients of liquid metal can be altered or reversed by varying the oxygen or sulphur content of the metal. It is also known to use a $CO_2$ assist gas during laser processing, which can alter the oxygen content of the metal. However, the welding literature is generally concerned with the formation of large scale mechanical bonds or structures rather than the formation of optical devices. In many cases, surface tension effects can be undesirable in the context of welding.

It is an aim of the present invention to provide an improved or at least alternative method of forming an optical device.

SUMMARY OF THE INVENTION

In a first, independent aspect of the invention there is provided a method of forming an optical device comprising:—applying a laser beam to a target area of the surface so as to selectively heat material of the surface thereby to provide transfer of material due to a surface tension gradient, wherein the surface is such that, when liquid, parts of the surface at lower temperatures have a lower surface tension than adjacent parts of the surface at higher temperatures. Thus, transfer of material due to the surface tension gradient may comprise a transfer of material to the target area, for example to higher temperature parts of the target area from lower temperature parts of the target area, or from outside the target area to the target area.

By providing for such a reversal of the usual surface tension gradient, a greater variety of surface features can be obtainable using laser radiation-induced, surface tension-driven transfer of material.

The obtaining of a greater variety of surface features using surface tension-driven transfer of material can be particular useful when the laser beam has an intensity such as to cause substantially no removal of material. Using a laser beam of such intensity can help to provide a surface with desired optical properties, for example preserving or improving the reflectivity of the surface, and avoiding significant roughening of the surface, which can be important when forming optical devices.

The laser beam may be such as to melt the surface material. The method may comprise melting the surface material at or near the target area using the laser beam, obtaining the transfer of material to form a desired surface profile, and allowing the surface material at or near the target area to re-solidify.

The laser beam may comprise a pulse or a train of pulses.

The method can be particularly useful in the formation of sub-optical wavelength scale features in the surface without substantial removal of material.

The method may comprise controlling the atmosphere at the surface so as to provide that the surface, when liquid, is such that parts of the surface at lower temperatures have a lower surface tension than adjacent parts of the surface at higher temperatures.

In a further independent aspect of the invention there is provided a method of forming an optical device comprising:—controlling the atmosphere at the surface and applying a laser beam to a target area of the surface so as to selectively heat material of the surface thereby to provide transfer of material due to a surface tension gradient.

It has been found that controlling the atmosphere at the surface can provide a particularly useful way of reversing the surface tension gradient. Controlling the atmosphere at the surface may comprise controlling the composition of the atmosphere, for example controlling the amounts of one or more component gases in the atmosphere. Alternatively or additionally the method may comprise controlling the atmospheric pressure at the surface, and/or controlling the relative pressure of one or more constituent gases.

It has been found that chemical reactions, chemical migration, diffusion and evaporation can play a significant role in the relationship between surface tension and temperature. Accordingly, providing a suitable gas at the surface for reaction with the heated area of the material can result in a different surface tension gradient being formed when the material is selectively heated than would be the case if such a gas was not present. In one arrangement, controlling the atmosphere may comprise providing an atmosphere at the surface rich in a gas that causes oxidation, phosphorus evaporation, carbide formation and/or chromium migration. Controlling the atmosphere may comprise providing an atmosphere at the surface that is rich in a non-noble gas, such as a gas comprising oxygen and/or carbon. For example, controlling the atmosphere may comprise providing an atmosphere rich in carbon-dioxide and/or carbon-monoxide. Alternatively, controlling of the atmosphere may comprise providing a reducing atmosphere at the surface, for example an atmosphere rich in nitrogen or hydrogen.

The controlling of the atmosphere may comprise providing a $CO_2$ or CO rich atmosphere at the surface during application of the laser beam to the surface. A $CO_2$ rich atmosphere may be an atmosphere wherein the amount of $CO_2$ is greater than that naturally present in air, preferably greater than 5% and most preferably, greater than 10% concentration in atmosphere at standard atmospheric temperature and pressure or a similar partial pressure for that quantity of gas in another gas, for example argon, or a vacuum. Providing a $CO_2$-rich atmosphere at the surface can provide a particular convenient way to provide the desired surface tension gradient. Alternatively or additionally the method may comprise providing an oxygen rich atmosphere or sulphur-rich atmosphere, for example an $H_2S$-rich or $SO_2$-rich atmosphere, nitrogen rich atmosphere or/and hydrogen rich atmosphere at the surface.

The method may comprise providing a surface comprising material having a composition such as to provide that, when liquid, parts of the surface at higher temperatures have a higher surface tension than adjacent parts of the surface at lower temperatures. The composition may be achieved by treating the surface of the material with a surface active agent that reacts with the material to result in a surface, which, when liquid, has parts at higher temperatures with a higher surface tension than adjacent parts of the surface at lower temperatures. The surface active agent may cause oxidation, phosphorus evaporation, carbide formation and/or chromium migration.

The method may comprise providing surface material that is oxygen or sulphur rich, and that may provide the desired surface tension gradient without necessarily requiring control of the atmosphere.

The method may comprise providing a surface comprising material having a selected oxygen or sulphur content.

Elements from groups 14, 15 and 16 and periods 2 and 3 of the periodic table are expected to have a significant effect on the relationship between surface tension and temperature, although group 13 elements in the same periods are also expected to be affective. For high period metals, such as silver, tungsten, platinum and gold, higher order non-metals may be used. Certain transition metals and alkaline earth metals also affect surface tension. In one arrangement, the surface material and/or surface active agent comprises one or more elements selected from the group of calcium, sulphur, manganese, silicon, titanium, zirconium, aluminium, magnesium, nitrogen, oxygen and phosphorus.

The method may comprise controlling at least one parameter of the laser beam to obtain a desired profile of the or each target region, thereby to provide an optical device with desired optical characteristics.

The at least one parameter may comprise at least one of intensity, wavelength, pulse length, and pulse repetition time.

The laser beam may have a greater intensity at a first part of the target area than at a second part of the target area.

The beam may have, for example, a Gaussian intensity profile. By providing areas with greater and lesser intensity, surface tension driven transfer of material between such areas may be obtained.

The laser beam may have an intensity above a threshold intensity thereby to reduce the transfer of material to the first part of the target area in comparison to the transfer of material to the second part of the target area. By providing such an intensity above a threshold intensity, the surface tension driven transfer of material to areas of higher temperature can be opposed by action of the laser beam. That can provide a particularly useful way of controlling the shape of the surface profile.

The laser beam may have an intensity above the threshold intensity at the first part of the target area and an intensity below the threshold intensity at the second part of the target area. Thus, preferential transfer of material to different parts of the target area can be obtained. A double peaked profile may be obtained from application of the beam, which can be a useful component in the formation of composite structures. The threshold intensity may be an intensity at which the laser radiation provides a significant ablation pressure and/or at which a significant vapour pressure from vapourisation of material of the surface is obtained.

The threshold intensity may be a minimum intensity for which the laser radiation acts to oppose the transfer of material due to the surface tension gradient.

The method may comprise applying both the laser beam and a further laser beam to the target area, wherein the laser beam has an intensity above the threshold intensity and the further laser beam has a maximum intensity below the threshold intensity.

The method may comprise applying one of the laser beam and the further laser beam to the target area, allowing the surface at the target area to at least partially solidify, and applying the other of the laser beam and the further laser beam to the target area.

Application of the further laser beam to the target area may fill in with material at least a portion of the profile of surface material formed by application of the laser beam, or vice versa.

Application of the laser beam may form a two peaked profile of surface material and application of the further laser beam may subsequently at least partially fill a well between the two peaks, or application of the further laser beam may form a single peaked profile of surface material and application of the laser beam may subsequently at least partially broaden the single peak.

The laser beam and/or the further laser beam may have parameters that are controlled such as to produce a profile of material at the target area that has a substantially flat top.

A flat topped structure can be particularly useful for the formation of phase scales or diffraction gratings. The parameters may be controlled to form a substantially square or rectangular structure.

The method may comprise applying the laser beam and/or the further laser beam to a plurality of target areas, each target area being at a respective, different position on the surface, thereby to build up a desired profile of material across the surface.

The method may comprise applying the laser beam and/or the further laser beam to the plurality of target areas in a sequence, wherein at least some of the target areas that are spatially adjacent to each other on the surface are temporally non-adjacent in the sequence.

The method may comprise applying the laser beam and/or the further laser beam to the target area a plurality of times thereby to build up a desired profile of material at the target area.

The method may comprise varying the composition of gas above the metallic surface, so that the composition of the gas is different for at least some of the times that the laser beam and/or the further laser beam is applied to the target area than for at least some other of the times that the laser beam and/or the further laser beam is applied to the target area.

The method may comprise blocking an outer part of the laser beam and/or the further laser beam from reaching the surface.

The method may comprise passing the beam through a beam shaper before applying it to the surface.

The beam shaper may be configured to redistribute power from higher intensity parts of the beam to lower intensity parts of the beam.

At least one of the laser beam and the further laser beam may have an intensity such as to provide transfer of material due to a surface tension gradient without substantial removal of material, for example without substantial ablation of material.

The optical device may comprise at least one of a metrological device, a phase scale, an amplitude scale and a diffraction grating.

In a further independent aspect of the invention there is provided an apparatus for forming an optical device comprising:—a laser for applying a laser beam to a target area of a surface; a controller for controlling a value of at least one parameter of the laser beam to be such as to provide selective heating of material of the surface thereby to provide transfer of material due to a surface tension gradient so as to obtain a profile of the target area that has desired optical characteristics; and means for controlling the atmosphere at the surface so as to provide that the surface, when liquid, is such that parts of the surface at higher temperatures have a higher surface tension than adjacent parts of the surface at lower temperatures.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which.

Figure 1:
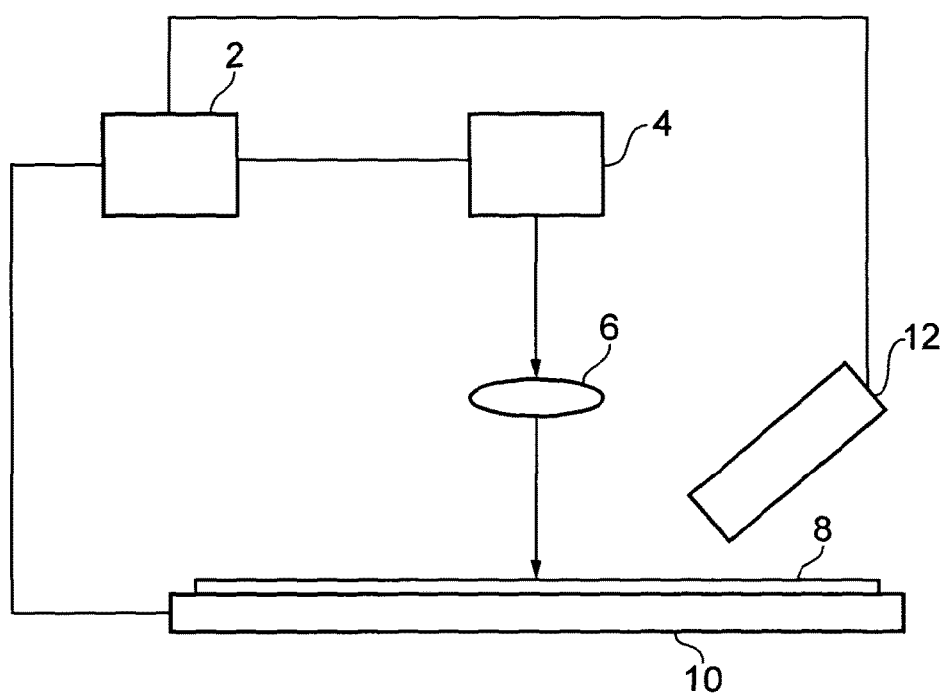
FIG. 1 is an illustration of an apparatus for forming an optical device according to an embodiment.

An apparatus for forming an optical device on a surface in one embodiment is illustrated schematically in FIG. 1. The apparatus comprises a control unit 2, for example a suitably programmed PC or a dedicated controller, which is connected to, and configured to control operation of a laser 4. The control unit shown in FIG. 1 is a DQB-PS control unit comprising a Renishaw UUC and SPA2+custom interface card. The laser 4 of the apparatus of FIG. 1 is a tripled Nd:YAG laser of 355 nm wavelength, in particular a JDSU Lightwave Q-switched Q301-HD laser, that is controlled to operate with pulse energies of the order of 100 µJ to 1 mJ, and pulse durations in the microsecond regime.

The laser 4 is aligned with focusing optics, comprising cylindrical lens 6, that in operation focus the laser beam produced by the laser 4 on a sample 8 mounted on a platform 10. Further optical components can be included between the laser 4 and the sample 8 to provide control and focussing of the laser beam as desired, according to known techniques.

According to one mode of operation of the embodiment of FIG. 1, the laser 4 can be controlled to produce a laser pattern on the surface of the sample 8 in the shape of a significantly elongated Gaussian spot, which is formed by passing a high quality circular Gaussian beam from the laser 4 through the cylindrical lens 6 to produce a spot at focus which is of the order of 1.5 mm in breadth by 4 µm long. The beam may comprise a pulse or a train of pulses. Stops (not shown) are provided to block an outer part of the beam in this embodiment.

The platform 10 on which the sample is mounted is a motorised platform that is connected to the control unit 2. The motorised platform in this case is a Danaher Dover Fibrebeam precision motion linear motor stage with Elmo controller. The control unit 2 is operable to move the motorised platform 10 relative to any desired position of the laser 4. By controlling movement of the platform 10 and by controlling operation of the laser 4, the control unit 2 is able to apply a laser beam having selected characteristics at a series of selected positions, also referred to as target areas, on the surface of the sample 8, so as to form an optical device having desired properties.

The control unit 2 is also connected to a controllable gas supply 12 that can output gas to flow across the surface of the sample 8. In the embodiment of FIG. 1, the gas supply 12 comprises a cylinder of $CO_2$, with a controllable flow valve that, in operation, is controlled by the control unit 2 to provide a desired flow rate of $CO_2$ gas across the surface of the sample 8. The $CO_2$ may be applied at a target area or across the sample as a whole. In alternative embodiments the sample is provided within a closed housing, sensors are provided to monitor the composition of gas above the sample 8 and the control unit 2 controls operation of the gas supply 12 in dependence on output from the sensors to control precisely the level of $CO_2$ in the atmosphere above the sample.

Figure 2:
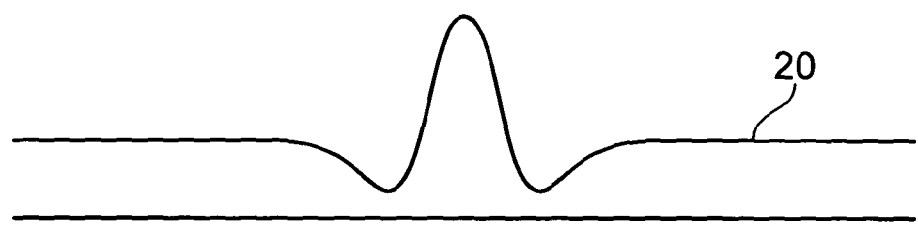
FIGS. 2 and 3 are schematic illustrations of the surface of a sample showing the profile of the surface after application of laser beam to a target region

It is a feature of the embodiment of FIG. 1 that by providing a $CO_2$-enriched atmosphere adjacent to the sample surface, the movement of material from the surface of the sample 8 caused by application of the laser beam can be altered. For example, it has been found that, when treating a metallic surface with a pulse of laser energy below a particular threshold under $CO_2$ assist gas the material of the surface can be caused to collect at the centre of the laser spot. That is illustrated schematically in FIG. 2, which shows a portion of the sample 8 after application of a laser beam produced by the laser 4. The sample 8 comprises a metal layer 20, in this case stainless steel, for example either martensitic spring steel, such as Sandvik Chromflex 7C27Mo2 Martensitic Stainless Steel (C 0.38%, Si 0.40%, Mn 0.55%, Cr 13.5%, Mo 1.00%), or cold-rolled austenitic-ferritic precision type 316 stainless steel strip. Upon application of the laser beam the metal layer in the region of the laser beam melts and is drawn towards the centre of the target region irradiated by the laser beam. When the laser beam is switched off or moved the metal solidifies and forms a profile having a peak as shown in FIG. 2.

Figure 3:

There is no substantive removal of the metal, and the material of the peak is drawn from the lower temperature melt pool either side of the centre of the laser spot. Note that the aspect ratio of this mark is exaggerated for clarity. The manufacture of an 8 µm pitch scale might require a central peak of approximately 4 µm length, and the height of the feature suitable for a phase scale which uses 800 nm illumination wavelength would be of the order of 200 nm. The profile of FIG. 2 is shown in FIG. 3 with a more realistic aspect ratio. It should be noted that FIG. 3 is also a schematic illustration and is not to scale, but provides a more realistic illustration of the ratio of pitch to depth than FIG. 2 for the described embodiment.

The presence of the $CO_2$ enriched atmosphere adjacent to the metal layer 20 causes the formation of a peak, rather than a well, at the centre of the laser spot. In the presence of a normal atmospheric composition, without $CO_2$ enrichment, the metal of the sample of FIGS. 2 and 3 flows away from the centre of the laser spot, and that application of the laser beam at power below an ablation threshold causes formation of a well rather than a peak, again without substantial removal of material.

The control of gas composition adjacent to the sample layer provides a further control parameter that can significantly alter the flow behaviour of sample layer material under action of applied laser radiation and can provided for improved control of formation of optical devices, as will be described in more detail below.

In one embodiment, a succession of the profiles shown in FIGS. 2 and 3, also referred to as marks, are formed adjacent to each other by repeated application of the laser beam at different, selected target areas. It is not necessary to produce adjacent marks in sequence, and there can be thermal advantages to producing a non-adjacent mark after producing a mark, and returning to produce the adjacent mark later. For example, marks can be produced with gaps between which are then filled in later. This method prevents local heat build up from distorting the form of the marks or accuracy of the scale. For instance, it can be ensured that the material of the originally produced mark has fully solidified before producing the adjacent mark and thus unwanted additional flow of the original mark can be avoided.

By suitable control of the laser beam and selection of the target area, marks of the correct size and a spacing which produces a desired degree of overlap can be produced in order to provide an optical device having a desired profile that in turn provides desired optical characteristics. For instance, the pulse energy, and duration can be controlled, along with the position of the surface being marked with respect to the optimum focus of the beam to produce a pattern of the correct dimensions in height, breadth and length.

In some embodiments, multiple lower energy pulses are used to generate small changes of material profile which, together, produce a required mark. This has the advantage of enabling a finer degree of control of the surface form, uses statistical averaging to mitigate the effects of variations between laser pulses, and has a polishing effect on the surface being marked further improving reflectivity and thus scale performance or other optical performance. In some embodiments up to 60 pulses are used to build up a single mark.

Figure 4:
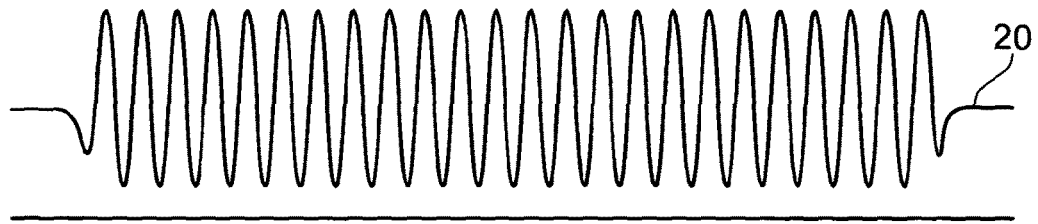
FIG. 4 is a schematic illustration of the surface of a sample showing the profile of the surface after application of a laser beam to a plurality of target regions to form a desired device profile.

FIG. 4 shows a device that has been formed in the surface of the material exposed to the laser beam energy pulses, and has a surface layer 24 that has a close approximation to a sine wave. Again, the aspect ratio of the mark is exaggerated for clarity.

The marks of FIGS. 2 to 4 are shown in side-view and it will be appreciated that they also have a breadth (in the case of these diagrams, the dimension extending into the plane of the page). The combination of marks shown in FIG. 4 has a breadth of the order of 1 to 5 mm, and in the case of a phase scale might usually extend in length (the dimension across the width of the page) from the order of 10 mm up to many meters.

The long axis of the Gaussian laser beam spot can have the unwanted side effect of creating shallower marks near its ends. However, if multiple passes are performed with a beam having a Gaussian profile in the long axis, overlap between adjacent steps being used to increase the depth of the marks away from the centre of the beam.

In some embodiments, including the embodiment of FIG. 1, the effect of shallower marks being produced by end parts of the beam is avoided or mitigated by using the stops to block the end parts of the beam from reaching the surface being marked, which has the advantage of producing marks which are useable all the way across their breadth. However, the use of stops reduces the breadth of the mark produced by each laser beam pass, and again in some embodiments multiple passes over the surface being marked are used with the position of the laser spot relative to the surface stepped along the breadth dimension between passes. That can produce a wider scale or other optical device, which can easier to install and align.

If sufficient power is available the elongated axis of the cross-sectional beam profile can be extended further and then stops used at each end to block the end parts of the beam from reaching the surface being marked. A combination of selectable stops and overlapping passes along the breadth of the scale can be used to make a pattern of practically unlimited breadth, usable all the way to its edge.

In an alternative embodiment, the laser beam is passed through a beam shaper, which transforms the Gaussian form of the beam in the elongated axis in to a flat-top profile. This can take the form of a refractive beam shaper, for instance a π-shaper as supplied by Molecular Technology GmbH. This device re-distributes power from the centre of the beam to its edges, but only along the extended axis of the spot. This has the advantage of producing the desired mark form along the whole breadth of the mark without requiring the significant extra laser power needed when stops are used to block the ends of the long axis of the beam. It will be understood that other known means of producing a more uniformly distributed beam along the breadth of the mark may also be used in further alternative embodiments.

The pattern of marks illustrated in FIG. 4 is produced under a $CO_2$ rich atmosphere which causes peaks rather than wells of material to be formed at the centre of the laser beam. The inventors attribute this change in flow behaviour to a reversal of the surface tension gradient with temperature, caused by the presence of the $CO_2$ enriched atmosphere, which causes material to flow from lower temperature regions to higher temperature regions (as opposed to the flow from higher temperature regions to lower temperature regions that occurs upon application of the laser beam at normal $CO_2$ levels).

A similar pattern of marks to that shown in FIG. 4 could also be produced by application of the laser beam at normal $CO_2$ levels, with the pattern being built up by formation of a series of wells at the centre of the laser beam spot rather than by formation of a series of peaks. It has been found however that marks or patterns of marks that are not otherwise obtainable or that are otherwise obtainable only with increased difficulty or time may be formed under reversed surface tension conditions (for example under a $CO_2$ rich atmosphere).

Figure 5:
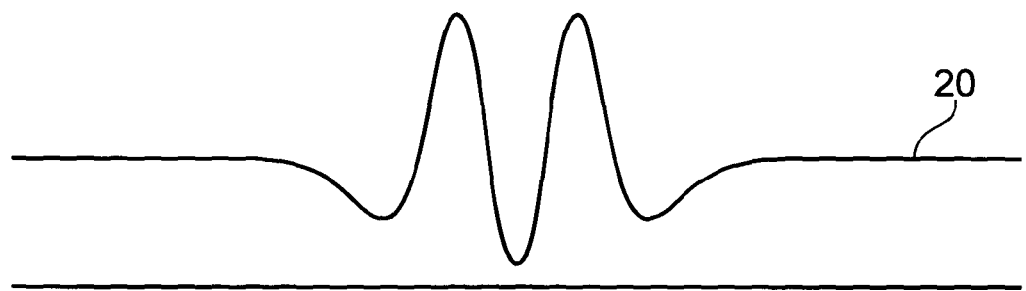
FIG. 5 is a schematic illustration of the surface of a sample showing the profile of the surface after application of a laser beam having an intensity in a central part of the beam that is greater than a threshold below which a central peak is formed.

For instance, it has been found that when a certain laser beam intensity is exceeded under a $CO_2$-rich atmosphere, the mark produced by the laser beam can take on the form illustrated schematically in FIG. 5 The inventors believe that the mark is formed by the surface tension gradient with temperature (associated with the $CO_2$-rich atmosphere) causing material to flow from lower temperature regions to higher temperature regions and possibly a flow reversal encountered towards the end of the melt. In the case of FIG. 5 the intensity is still sufficiently low that little significant, if any, ablation of material occurs and the surface is not significantly roughened. The threshold intensity may be a threshold average power, for example maintained for a threshold period of time. In the case of FIG. 5 the threshold intensity was obtained for a series of 10 pulses, 500 µJ per pulse. In practice a laser beam of intensity higher than the threshold may be used to form marks, for example a series of 10 pulses, 600 µJ per pulse in the case of FIG. 5 It will be understood that the threshold intensity may be determined by experimentation for different materials and conditions.

In the case of a further sample of the Chromeflex steel, the transition from surface tension effects alone to a combination of pressure and surface tension effects was found to occur for pulses of energy around 400 µJ focused on an area 4 mm×4 µm.

It has been found that the mark made by a single application of the laser beam above the necessary threshold to produce a mark having a shape like that shown in FIG. 5 has a greater length (the direction along the plane of the paper) by between 20% and 50% than the corresponding mark produced under the same conditions by a single application of the laser beam having an intensity below this threshold (for example as illustrated in FIG. 2). However, the mark produced by the laser beam having an intensity above the threshold has two peaks rather than a single peak, and thus the use of a laser beam having an intensity above the threshold in a $CO_2$-rich atmosphere can produce patterns having more closely spaced peaks despite the greater size of the individual mark produced by a single application of the laser beam. Usually the intensity is maintained below a further threshold intensity, for example beyond which ablation effects dominate surface tension effects.

In some embodiments the intensity of the laser beam is controlled to be close to the lower threshold so that that well between the two peaks is of negligible depth, thus effectively forming a single broader peak.

Figure 6:
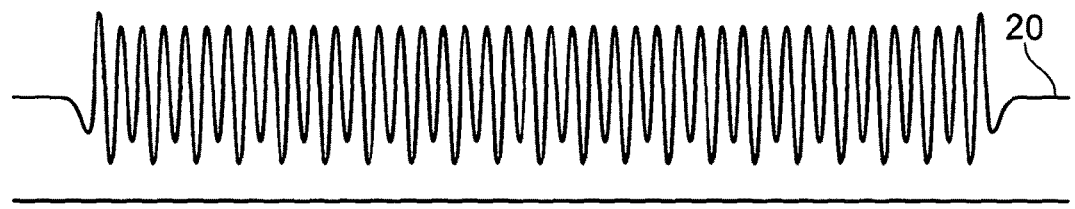
FIG. 6 is a schematic illustration of the surface of a sample showing the profile of the surface after application of a laser beam to a plurality of target regions to form a desired device profile in a further embodiment.

In a further embodiment, a series of marks at different target areas on the surface are produced by application of a laser beam having an intensity above the threshold in a $CO_2$-rich atmosphere, with the resulting pattern being illustrated schematically in FIG. 6. Each mark is merged with an adjacent mark to produce a continuous pattern which resembles a sinusoid. In this case each mark made by an application of the laser beam produces two peaks. As each mark is only 20% to 50% longer, but includes two peaks rather than a single peak, the pitch of the scale is significantly shorter (between 60% and 75%) than the pitch of scale that would be produced using a laser beam below the threshold. Thus, in FIG. 6 here are 42 peaks, compared with 24 peaks in the same length (as illustrated in FIG. 4 that are produced using a laser beam having an intensity below the threshold at which double peaks are formed).

In the embodiment of FIG. 6 when the spacing of the marks is set such that an even pitch is achieved, and the volume of material is substantially constant (that is, substantially no material is ablated during laser processing) an uneven feature depth can result. In the case where the pattern is used as a phase scale the contrast between the fringes generated by the phase scale can be reduced by uneven feature depth, which can be a source of noise in the electrical signals output by a readhead when reading the phase scale. Nevertheless, a scale of smaller pitch can be produced rapidly using the method. Further processing can also be used, if desired, to even out feature depths, for example using additional ablation or filling steps.

In embodiments that apply a laser beam having an intensity above the threshold it can be particularly useful to use stops or a beam shaper to ensure that the central part of the beam has an intensity above the threshold across the entire breadth of the beam. Otherwise, the edges of the beam may form a single peaked profile rather than a desired double peaked profile.

In a further embodiment, a laser beam having an intensity above the threshold and a laser beam having an intensity below the threshold are applied successively by the laser 4 to the same target area under reversed surface tension conditions (for example under a $CO_2$ rich atmosphere). It has been found that by applying such successive laser beams above and below the threshold, the different shaped marks formed by the laser beams combine to form particularly useful optical features. It will be understood that the threshold intensity for a particular surface material under selected conditions can be readily determined by the person skilled in the art.

For instance, the double peaked mark produced by a laser beam having an intensity above the threshold can effectively be combined with the single peaked sinusoid-like mark produced by a laser beam having an intensity below the threshold, in order to improve over a pure sinusoid-like profile by flattening out the peaks and troughs of the sinusoid. That makes the form of the mark more closely resemble a square wave, which is the theoretical ideal for high contrast fringes, as illustrated schematically in FIG. 7 for a depth of 200 nm deep and a length of 4 μm. Again, the aspect ratio (height to width ratio) is exaggerated for clarity.

Figure 7:
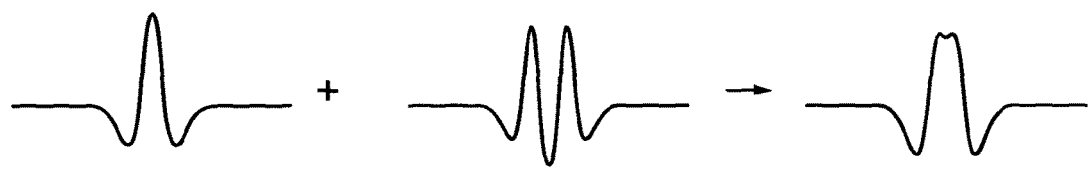
FIG. 7 is a schematic illustration of the surface of a sample showing the surface of the sample after application of a laser beam to a target region.

The combined mark illustrated in FIG. 7 is similar to that produced by a single laser beam with power below the threshold that produces a double peak, but has a flatter top to the peak. It might be expected that the surface profile formed by the first laser beam would distort the profile formed by the second laser beam such that there would be a distortion of the illustrated additive combination of marks. However, any such distortion, if present, does not seem to cause any significant difficulties.

Figure 8:
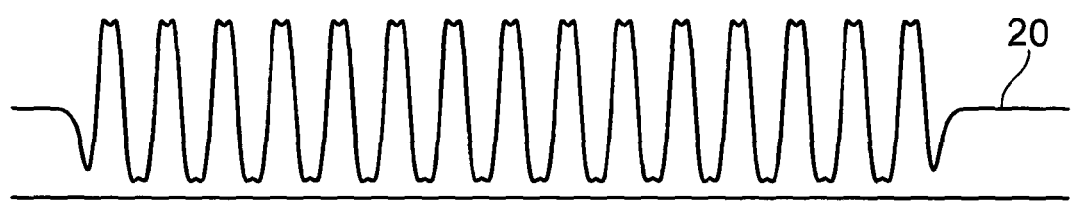
FIG. 8 is a schematic illustration of the surface of a sample showing the profile of the surface after application of a laser beam to a plurality of target regions to form a desired device profile having flat topped regions.

In a further mode of operation, the apparatus of FIG. 1 is operated to form a scale with flattened peaks and troughs by making at least two passes of the laser beam over the surface to be marked to form marks at each of a plurality of target areas, directing pulses below the threshold that produces the double peak and pulses above this threshold at the surface to each target area. A schematic representation of the resulting pattern of material that is generated is shown in FIG. 8. Again the aspect ratio is exaggerated for clarity.

The combined multi-pass method described in relation to FIG. 8 provides additional process parameters which can be optimised to achieve a desired depth and width of the optical features, and the flattening of peaks and troughs. For instance, the pulse power and degree of focus can adjust a feature depth and width; the degree to which the pulse is above threshold at which a double peak is formed can be used to control the depth of the central trough in that feature, which controls the degree of flattening of the peak; the width of the marks and their separation can be adjusted to control the flattening of the trough. The overall depth of the marks can be increased by using multiple pulses. Also the direction of flow of molten material can be reversed by means of performing marking with or without $CO_2$ cover gas. Using these parameters the form of the marks can be accurately controlled.

It will be understood that the laser beam parameters needed to produce particular effects or structures can vary for different materials and conditions, and that suitable laser beam parameters can be determined by experimentation.

For instance in further embodiments it has been found that to produce single peaked marks on a spar of cold rolled austenitic-ferritic precision type 316 stainless steel a series of 10 pulses, each 30 μs long at powers between 300 μJ and 400 μJ per pulse can be used, with a cylindrical lens focal length=40 mm, and a nominally Gaussian input beam of diameter around 3.6 mm. With 600 μJ, 60 μs long pulses the centre is depressed by ablation pressure, giving the double peaked structure. For the limit of 500 μJ per pulse with 10 pulses mixed results are obtained, for example protrusions can be found next to dips on the same sample, or a wobbly surface can be produced. For energy per pulse ≥600 uJ dips/grooves are obtained without visible protrusions.

The dimensions of lines produced in various experiments using laser parameters from the preceding paragraph include:

In air on the stainless steel spar—between 2 μm and 8 μm wide, 1 mm to 2 mm long. Depth:—up to 1.5 μm deep in high energy regime (surface tension and recoil pressure effects), more usually 200 nm to 300 nm deep, but up to 500 nm in low energy regime (surface tension effects only).

In $CO_2$ on the stainless steel spar:—line width: approximately 4 μm wide, length: approximately 1 to 2 mm long, peak to trough depth: up to 120 nm.

In air and on Nickel: protrusions having a line width of approximately 4 μm, length 2 mm, peak to trough depth: up to 350 nm.

It will be understood that the nature and dimensions of lines or other patterns that can be produced are not limited to those mentioned in the preceding four paragraphs. A wide range of desired patterns and dimensions can be obtained with suitable choice of laser parameters.

In further embodiments, a $CO_2$-rich atmosphere is provided at to the sample surface for different laser beam pulses and the level of additional $CO_2$ adjacent to the surface is controlled to be different for different pulses, thus providing an additional control parameter for controlling the shaping of the surface material.

In other embodiments, the composition of the atmosphere adjacent to the surface is controlled by controlling the amount of other gases, as well as or instead of $CO_2$, in order to vary surface tension effects, for example in order to provide a reversal of the surface temperature gradient with temperature. In some such embodiments, $H_2S$ gas is provided at the surface. The pressure of the atmosphere at the surface, and the relative pressure of components of the atmosphere is also controlled in some embodiments.

It has also been found that a reversal of the usual surface temperature gradient with temperature can also be provided by providing a suitable surface material, for example stainless steel that has a sufficiently high oxygen content. A further example of such a material that is used in some embodiments is nickel deposited as a layer on a thicker layer of copper. In embodiments that use such materials, surface tension gradient-induced flow from lower temperature regions to higher temperature regions can be obtained even for normal atmospheric compositions, for example in air and without a $CO_2$-rich atmosphere being provided adjacent to the surface of the material. Such embodiments can provide for formation of optical devices using a combination of laser pulses having intensities above and below particular thresholds, similar to those illustrated in FIGS. 7 and 8.

The extent to which surface tension is related to temperature for stainless steel has been shown to, at least partially, depend on the presence of elements, such as sulphur (see *Equation to estimate the surface tensions of stainless steel*. Y. Su, Z. Li, K. C. Mills. s.l.: Journal of Materials Science, 2005, Vols. 40 (2005) 2201-2205 and *Determination of the surface tension of liquid stainless steel*. Z. Li, K. Mukai, M. Zeze, K. C. Mills. s.l.: Journal of Materials Science, 2005, Vols. 40 (2005) 2191-2195). Material flow in liquid iron films appears to be affected by oxygen contamination (see *Thermacapillary flow excited by focused nanosecond laser pulses in contaminated thin iron films*. V. Yu. Balandin, D. Otte, O. Bostanjoglo. 3 pages 2037-2044, s.l.: Journal of Applied Physics, 2005, Vol. 78). Nickel-phosphorous surfaces demonstrate comparable behaviour with phosphorous concentration (see *Melting and surface deformation in pulsed laser surface micromodification of Ni-P disks*. S. C. Chen, D. G. Cahill, C. P. Grigoropoulous. s.l.: Journal of heat transfer, 2000, Vols. 122 pages 107-112) an effect which may be casued by phosphorous evaporation (see *Marangoni mechanism in pulsed laser texturing of magnetic disk substrates*. T. D. Bennett, D. J. Krajnovich, C. P. Grigoropoulos, P. Baumgart, A. C. Tam. s.l.: Journal of Heat Transfer, 1997, Vols. 199 pages 589-596). Observations from the welding industry reinforce the importance of surface elements for surface tension and bulk fluid motion in a melt pool (see *Welding 304L stainless steel tubing having variable penetration characteristics*. I. Grant, M. J. Tinkler, G. Mizuno, C. Gluck and *Marangoni effects in welding*. K. C. Mills, B. J. Keene, R. F. Brooks, A. Shirali. 1739 pp. 911-925, s.l.: Philosophical Transactions: Mathematical, Physical and Engineering Science, 1998, Vol. 356) with sulphur, oxygen and nitrogen being the surface active elements. As few as ten parts per million of the active element can have a large effect. For stainless steel, calcium, sulphur, manganese, silicon, titanium, zirconium, aluminium, magnesium and oxygen appear to affect the surface tension. For nickel, phosphorus appears to have a significant effect, although oxygen can also play a role.

Any suitable materials can be used for the sample in alternative embodiments, as well as or instead of stainless steel. For phase scale applications it is generally desirable that the surface layer of the sample is as reflective as possible and does not tarnish easily. The surface layer of the sample may be metallic, either a pure metal or an alloy. The sample can comprise a surface layer of a first material formed on a substrate of a second, different material, for example glass or polymer, or can be formed of a single material. Suitable materials for the sample can include steel, chrome, nickel, gold, silver or indium. In some embodiments the marks are formed to provide a pattern having a desired profile in a non-reflective material for example a thermoplastic material such as a suitable polymer, which is subsequently coated with a reflective coating, such as a chrome coating, in a subsequent process.

The method can be used for the formation of any suitable optical device, including diffraction gratings, reflective holograms or metrological devices such as amplitude or phase scales.

Further features are described in Appendix 1 and 2.

It will be understood that the present invention has been described above purely by way of example, and modifications of detail can be made within the scope of the invention.

Each feature disclosed in the description, and (where appropriate) the claims and drawings may be provided independently or in any appropriate combination.

Appendix 1

YAGboss – laser micro-sculpting of metal surfaces for the manufacture of high precision optical encoder scale S. Giet, F. Albri, M. D. Kidd, J. D. Shephard
N. J. Weston, D. P. Hand Heriot Watt University, Department of Physics, Edinburgh Scotland, UK
Renishaw plc, Edinburgh, Scotland, UK ICALEO® 2010
September 26 - 30, 2010
Anaheim, California USA Dear all, Today I am going to present YAGboss. That process has been developed in collaboration with our HPLA group, Renishaw. And the whole collaboration has been funded by the TSB. YAGboss is a laser-machining technique used to create fine features at the surface of metals.

Outline

- Motivation: high reliability process control

- Optical Position Encoders (OPE)

- YAGboss: laser surface texturing of metal

- Manufacture of OPEs diffractive scales with YAGboss

This slide presents the outline of my talk. I'll introduce the context of this project, and what Optical Position Encoders are.
Then I will describe the YAGboss process and how we plan to use it in order to produce diffractive scales that will be integrated in OPEs.

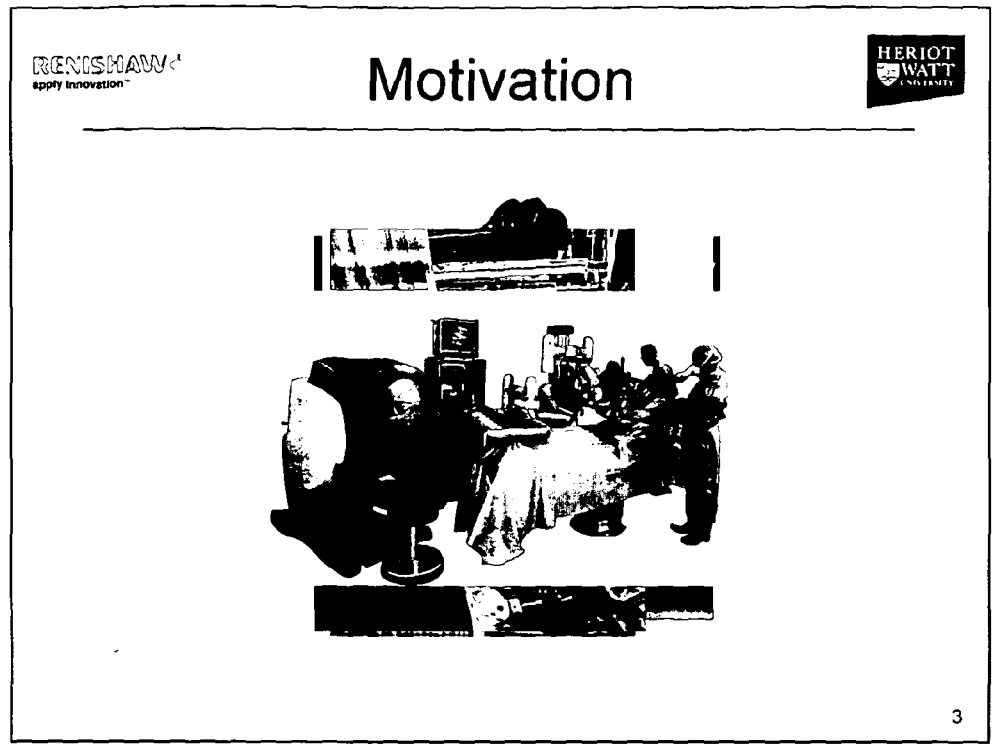

In a growing number of applications such as manufacturing or life science, process control is closely linked to quality output. It enhances process reliability, company credibility and provides a direct competitive advantage. Part of this process control in automated systems is provided by high performance and high accuracy motion systems and components.

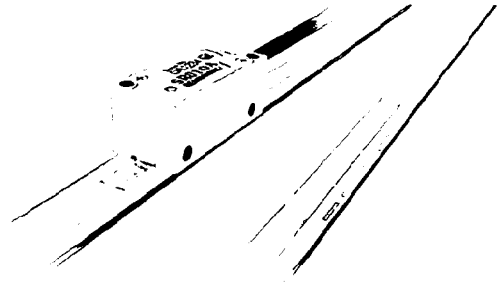

- Reliable high-accuracy location feedback

High precision optical position encoders (OPE) are such devices. They can be found in machine tools, assembly systems and robotics as well as in medical applications.

They provide reliable high-accuracy location feedback and contribute to the accuracy of automated precision positioning systems [1].

- Reliable high-accuracy location feedback
- Measuring and recording displacements of moving parts
- Automatic positioning in machine tools
- Correction of errors in the relative motion of machine tool parts

RENISHAW Optical Position Encoders — HERIOT WATT

- Diffractive scale
- Read-head:
  - Light source
  - Photo-detector
  - Two gratings, aligned to the same precision as the mark on the scale

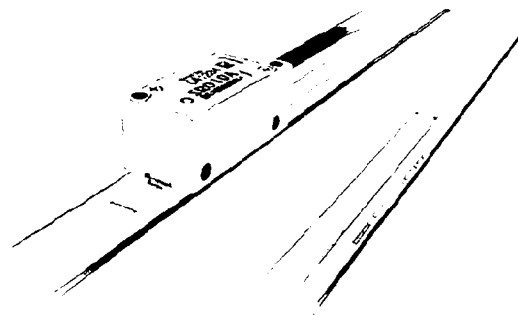

The readhead includes: (a) a light source for producing rays incident on the scale, (b) an index grating for diffracting readable rays into fringes in at least one order of diffraction, (c) an analyser grating for converting fringes into light modulations at a rate which is a function of the relative movement between the scale and the readhead and (d) arrays of photo sensitive elements for converting the light modulations into a representative electrical signal.

Works in reflection

These devices are facing the challenges of increasingly demanding applications such as laser systems for medical stent cutting, vacuum based spatial equipment assembly or electronics manufacturing. These applications typically call for nanometer resolution positioning. Current fabrication schemes for OPE scales are no longer in tune with these requirements. Based on expensive lithography techniques and inaccurate embossing methods, they respectively lack flexibility and resolution. For this reason, we propose a concept using a laser-based process for sub-micron texturing of metallic surfaces In this project, lead in partnership with Renishaw, our job at university or to create the diffractive scale.

Our requirement is a grating with an 8μm period which can be used with a read-head light source emitting in IR at 830nm. The grooves need to be 200±20nm deep to exhibit maximum diffraction effects in the 1$^{st}$ order. This is achieved by machining juxtaposed lines using a laser line focus.

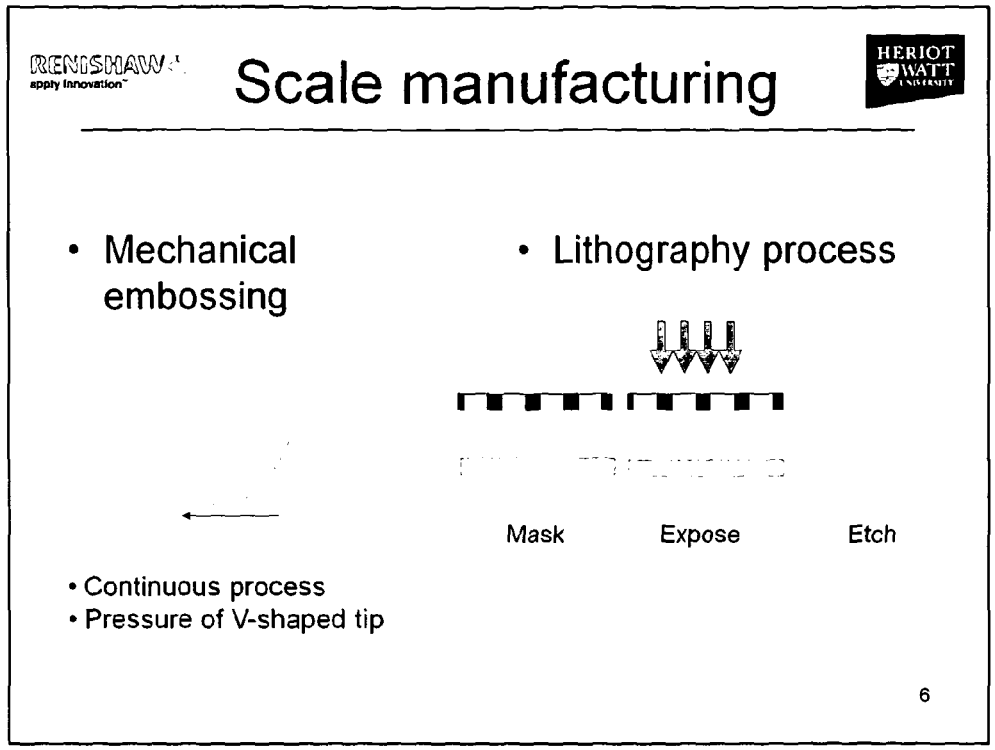

Precision?

Speed?

Traditionally, the highest resolution scales have been lithographically formed on glass substrates. These are limited in length, fragile and expensive. Rugged scales have traditionally been mechanically embossed into flexible tape, and are limited in resolution. A change of approach to high resolution scale manufacture is required in order to develop technology which is appropriate to highly dynamic or rugged environments where extreme reliability is essential, for example in medical or satellite applications. This involves a reduction of flexible tape scale's features' geometry and size. In this academic-industrial partnership, we are investigating novel techniques for the production, at commercially viable rates, of optical encoder scales with features of the required precision (200 ± 10 nm).

The two main scale fabrication processes currently used are (i) an expensive and inflexible lithography technique onto a glass substrate; and (ii) a mechanical embossing method where uniform pressure is applied onto a reflective substrate. The mechanical technique, however, lacks the resolution to produce the 4 mm wide grooves required here, whilst the lithographic technique is too expensive for most applications, and produces an inflexible scale.

Manufacturing limitations

- Mechanical embossing

- Lack of resolution
  - Lack of flexibility

- Lithography

- Not commercially suitable for low volume production
    - expensive precision masks
    - practical limits on mask length
    - "step and repeat" process
  - Lack of flexibility
  - Slow, multi-steps process

YAGboss

- Laser-based process

- Direct write method

- Sub-micron texturing of metallic surfaces

- Based on laser-induced Marangoni effects

- Named after pulsed Nd:YAG laser used to 'emboss' materials

Requirements:
Sinusoidal profile
8μm period,
200±20nm deep grooves

Requirement: a grating with an 8μm period which can be used with a read-head light source emitting in IR at 830nm. The grooves need to be 200±20nm deep to exhibit maximum diffraction effects in the 1st order.
The grooves need to be 200±20nm deep to exhibit maximum diffraction effects in the 1st order.

•These gratings are engineered to have a smooth sinusoidal profile.

•Requirement: a grating with an 8μm period, grooves 200±20nm deep to exhibit maximum diffraction effects in the 1st order @ 830nm

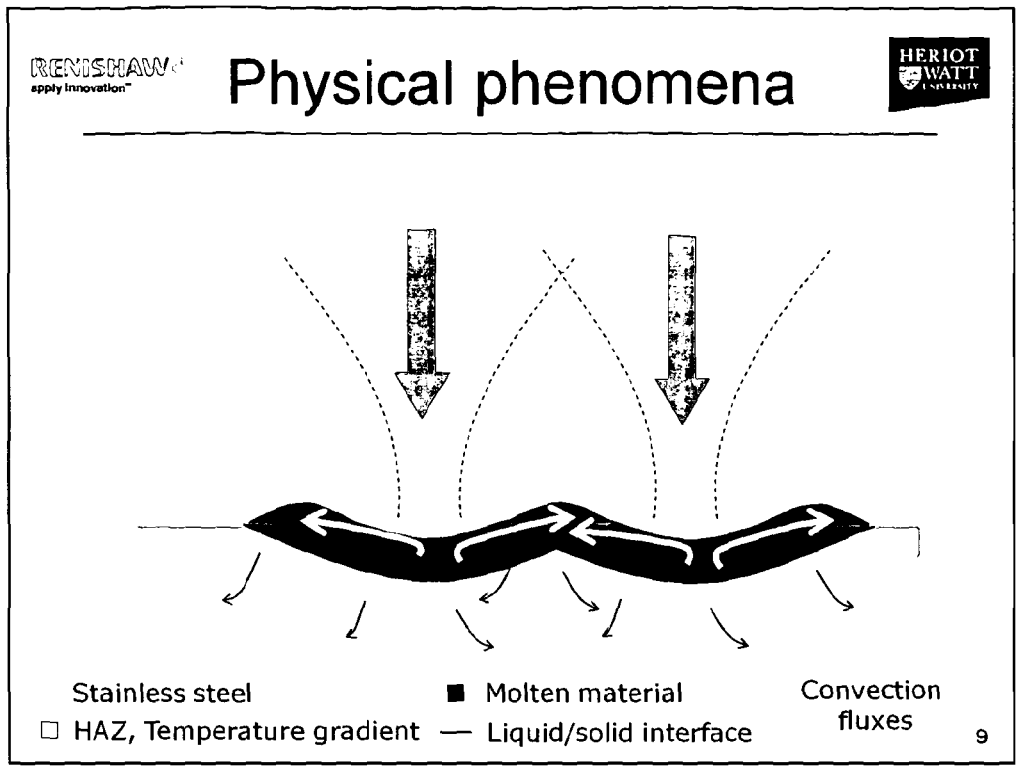

successive physical phenomena involved in the process of generating a single line 1. local laser beam absorption at the surface of the metal;
2. local heating and heat propagation;
3. the metal surface at the point of incidence reaches its melting temperature;
4. melt front propagation;
5. development of surface tension variance across the meltpool due to temperature variance, and hence localised melt flow;
6. the metal surface reaches vapourisation temperature at the point of incidence;
7. formation of recoil pressure enhancing the surface tension effects and pushing the edges aside.
8. Clearly phenomena 1-5 could occur without 6 & 7, dependent on the intensity. In this paper we explore the relative importance of phenomena 5 and 7 in generating the required structure

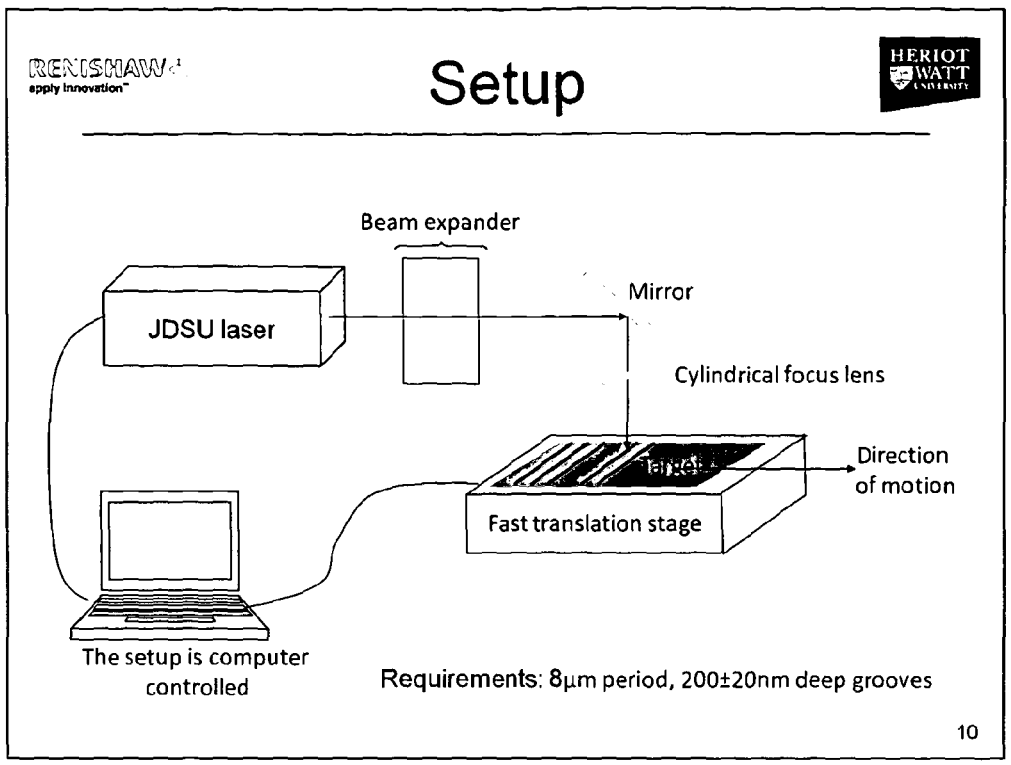

Experiments were carried out using a JDSU Nd:YAG q-switched laser operating at 355nm. The pulse width is 35ns. A telescope is used to convert the 1.6mm diameter beam output from this laser into a 3mm diameter collimated beam. A cylindrical lens of focal length 40mm is then used to generate the required focus line, 4μm × 3mm, at the surface of the sample. The sample is positioned using a XYZ translation stage and moved across the focused beam in 8μm steps along the longitudinal axis. The translation stage has a precision accuracy of ~100nm.

The machining process is automated, with the triggering and motion system being centrally computer controlled. The maximum marking speed is currently limited by interface communication time.

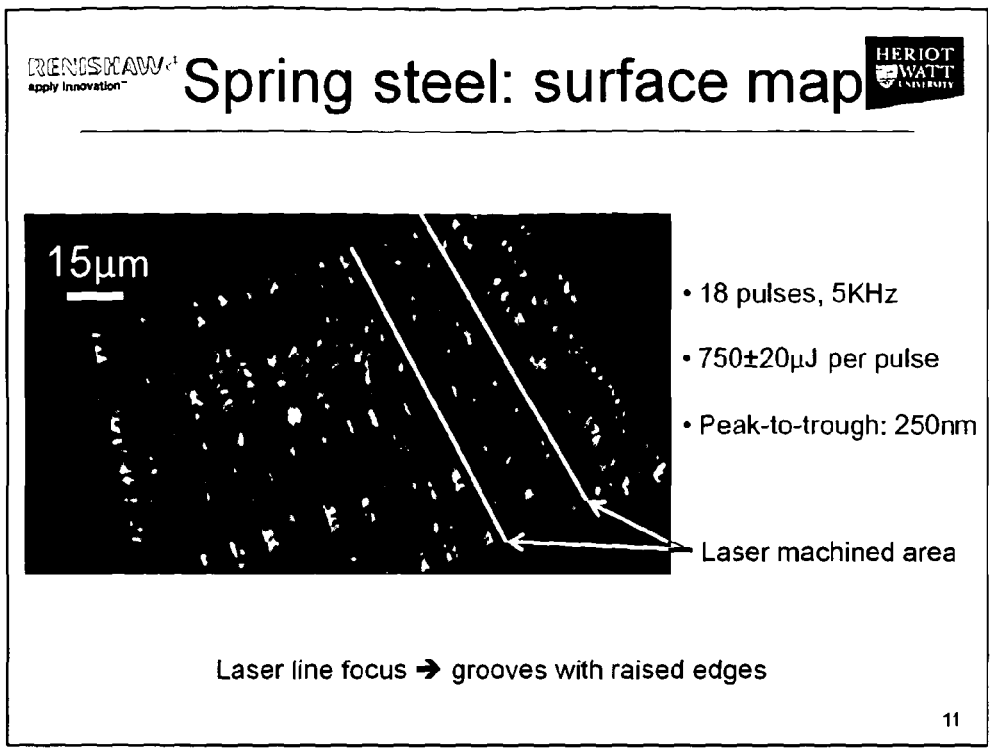

In this section, we report the results achieved with an 8 mm wide, 0.20 mm thick semi-rigid spring steel piece, tested in its as-received condition. The surface is a high quality rolled surface, with irregular longitudinal features along its pulling and rolling axis. The surface is lightly oiled after manufacture to avoid corrosion.

Figure 3 shows a typical sinusoidal profile achieved with the YAGboss process, with each groove machined using 18 pulses of 750±20mJ energy at a marking repetition rate of 5kHz.

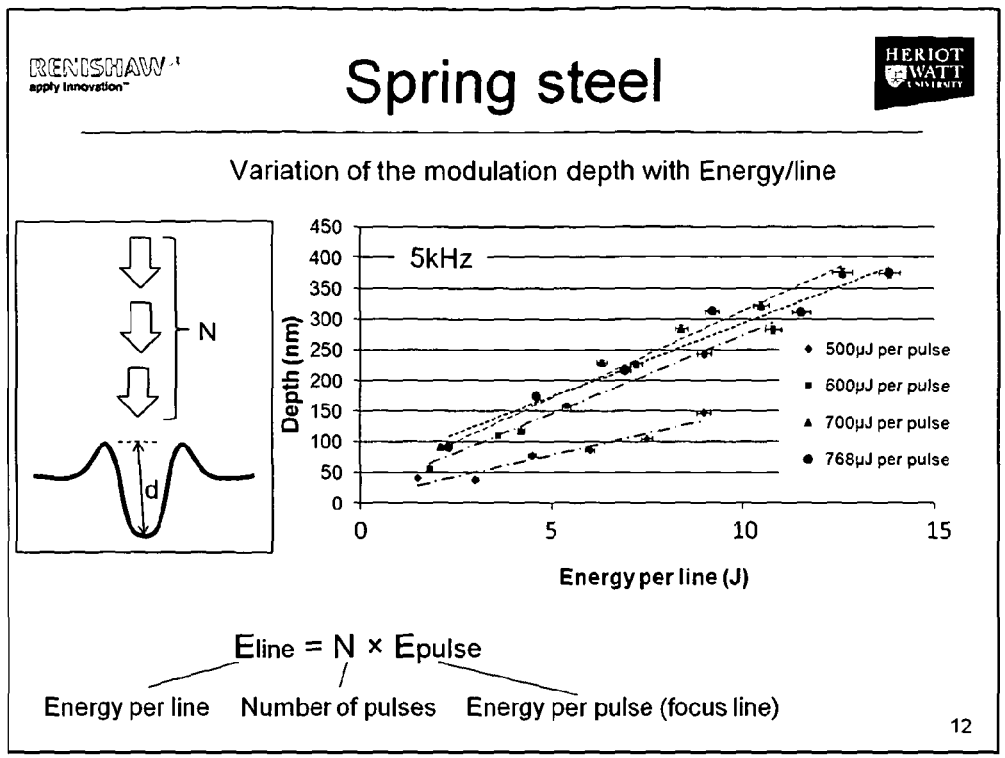

To create gratings of the correct modulation depth, it is important to understand the relationship between modulation depth, pulse energy and number of pulses. A number of measurements were therefore made and are plotted in Figure 29.

The graph in Figure 3 shows the groove depth $d$ as a function of total energy $E_T=E_P N$ per line, for different pulse energies $E_P$ where $N$ is the number of pulses used. The depth $d$ has a roughly linear dependence in each case, albeit with slightly different gradients. This, together with the rather small magnitude of the depth achieved, suggests that the process involves mainly melting with little or no vapourisation. In other words, the shaping and formation of the grooves relies mainly on local convection fluxes and surface tension variance: once the material is locally heated and a melt pool is formed, the liquid material is pulled towards the edges of the laser illuminated region.

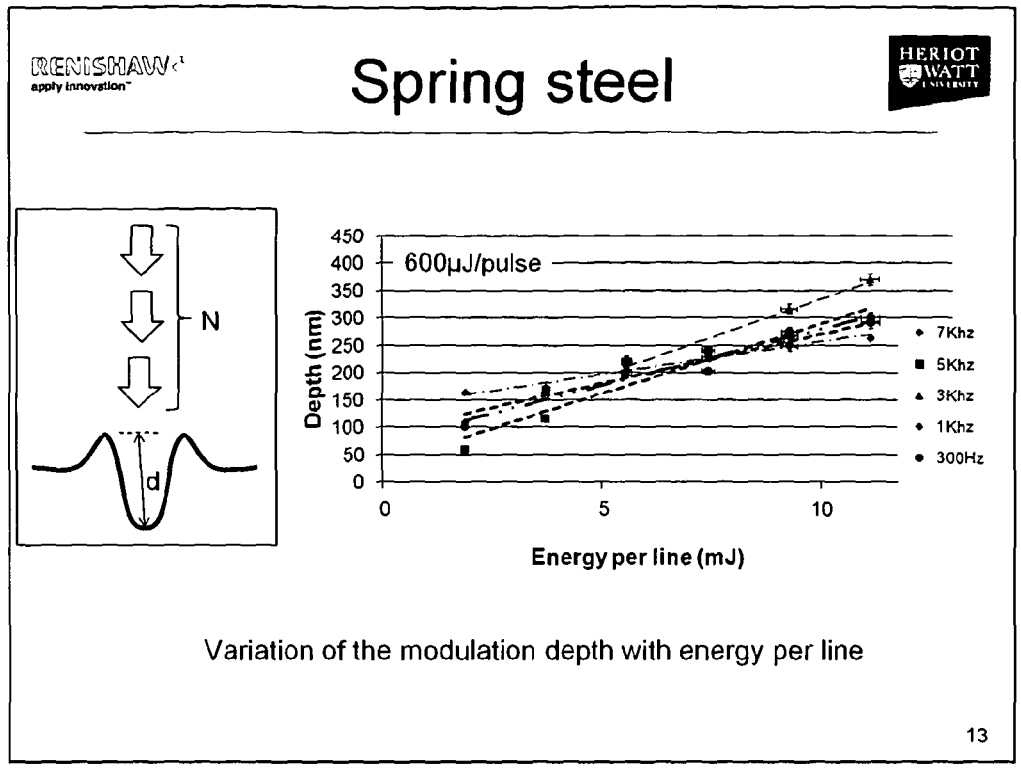

Variation of the modulation depth with energy per line

The graph plotted in figure 4 shows the variation of groove depth at a constant 600μJ pulse energy for different repetition rates. The pulse separation varies from 3.3ms at 300kHz to 0.1ms at 10kHz. It is clear that the repetition rate has little influence on the depth, which is proportional to the number of pulses used to machine a line. It is proposed that there is a spreading of the heat affected zone (HAZ) and of the molten pool as the number of pulses increases [8].

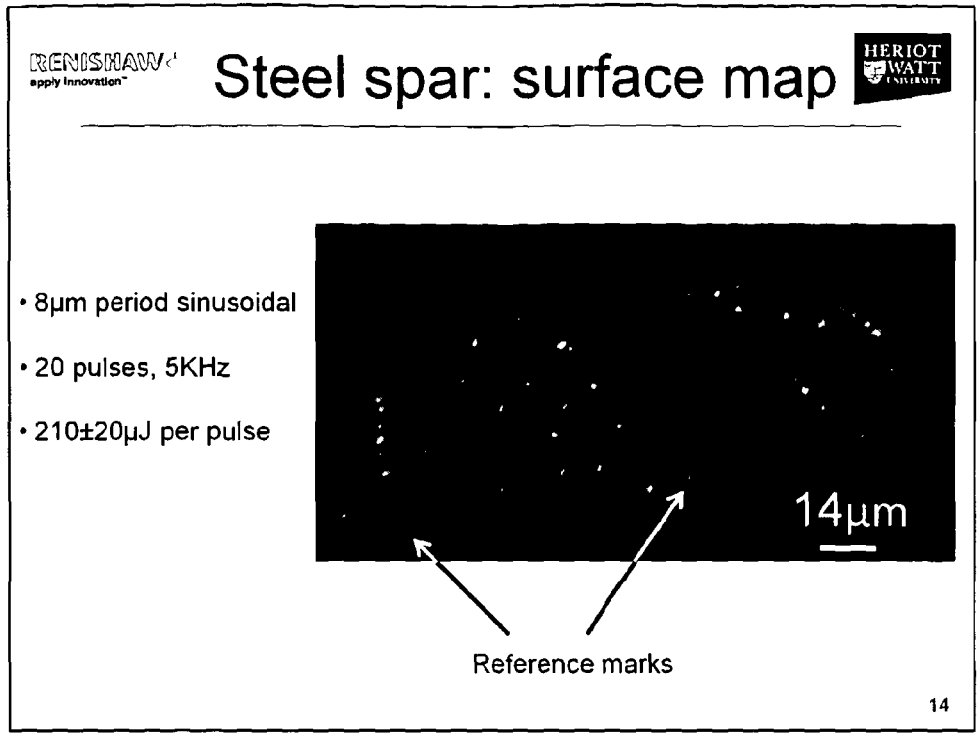

Similar experiments were carried out using a rigid spar of stainless steel. Figures 5, 6 and 7 show the gratings achieved at a repetition rate of 5kHz with a pulse energy of 208±20μJ and a burst of 20 pulses. The grating shows a good homogeneous sinusoidal profile other than 2 deliberately missed lines (created to generate 'reference marks'). The graph of depth against energy per line presented in Figure 8 clearly shows two regimes. With a low energy pulse, the depth is only weakly (linearly) dependent on the energy per line. It is thought to be due to a combination of melting and surface tension effects.

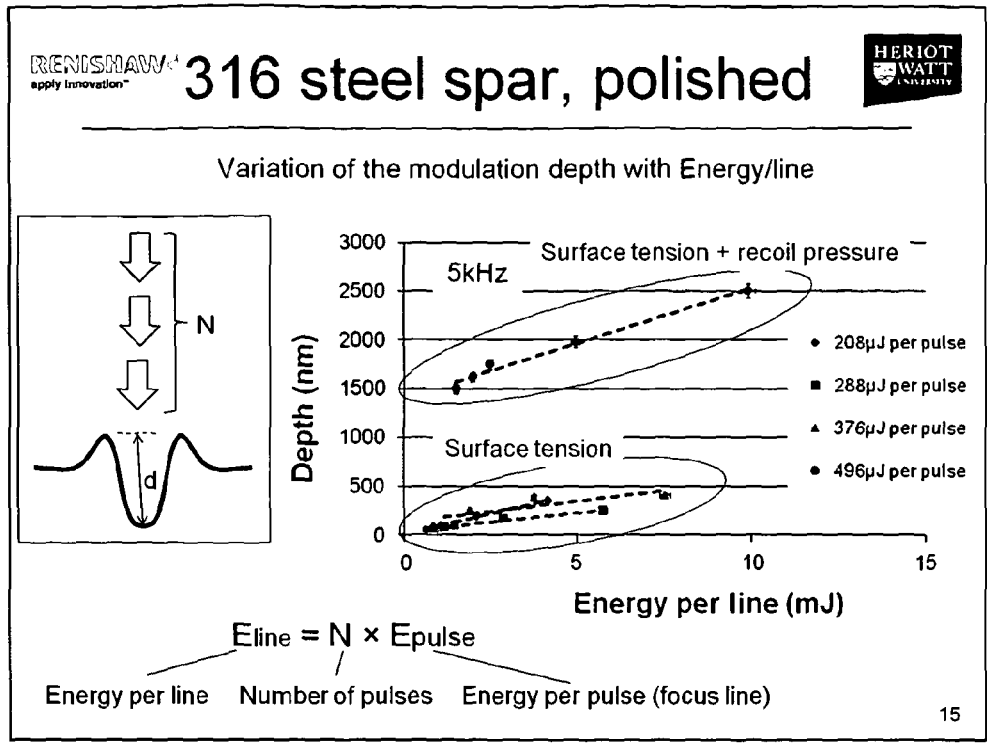
With a high energy pulse, the depth is much larger and its gradient with energy per line is much steeper, We postulate that the increased depth is due to the onset of vapourisation and hence significant vapour recoil pressure, whereas in the low energy pulse regime only the varying surface tension effects are significant.

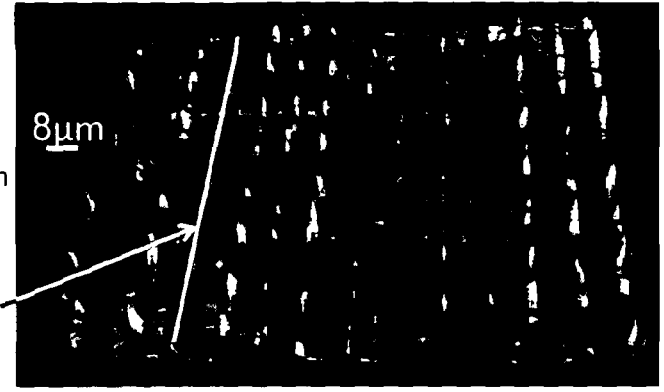

To investigate further the relative importance of the surface tension effects and the recoil pressure, experiments were carried out with the sample under a flow of $CO_2$ gas at 15°C. Literature [7, 9] shows that $CO_2$ significantly influences the convection fluxes of molten metallic materials; indeed we would expect the material to flow towards the centre rather than towards the edges of the focused beam. We would expect the recoil pressure, by contrast, to always have the opposite effect.

Figure 9 shows the surface of a mechanically polished stainless steel spar sample marked with a line focus, under a blanket of $CO_2$ gas. A set of 10 pulses, each of energy 400µJ is used for each line. In contrast to the situation with processing in air, the intensity peak creates a protrusion (rather than a depression), confirming that with this pulse energy, surface tension (rather than recoil pressure) effects dominate. Furthermore, the lines processed under $CO_2$ are narrower than the lines generated in air. Unlike the processing in air where the molten material overflows towards the edges of the markings, the molten material in $CO_2$ atmosphere remains localised under the optical radiation.

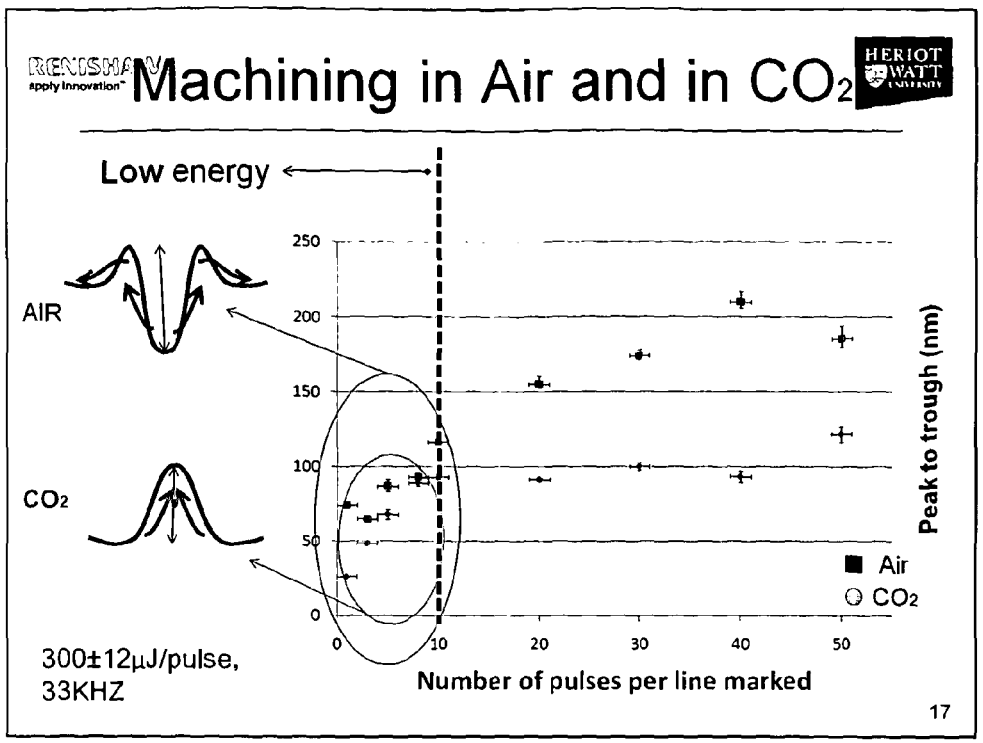

In a second set of experiments carried out in air and subsequently under $CO_2$, the number of pulses (of fixed pulse energy $E_p$ = 300mJ) used to mark a single line was increased sequentially. Results are presented in Figure 10.

The modulation depth (peak to trough) of the material processed in $CO_2$ reaches a plateau at ~100nm for a large number of pulses (>10 pulses), i.e. for large total line energies $E_T \geq 3mJ$, whilst the modulation depth of the lines marked in air keeps increasing. A possible explanation is that the heat build-up which occurs during a series of pulses results in the onset of vapourisation after 10 pulses; in the case of air this enhances the depression created by the high intensity region, whilst in $CO_2$ it counteracts it.

If the pulse energy is further increased in the $CO_2$ processing case, the profile of a single line created by a series of pulses changes from a protrusion to a dip (see figure 11), i.e. more similar to the case in air; hence in this regime vapourisation becomes dominant.

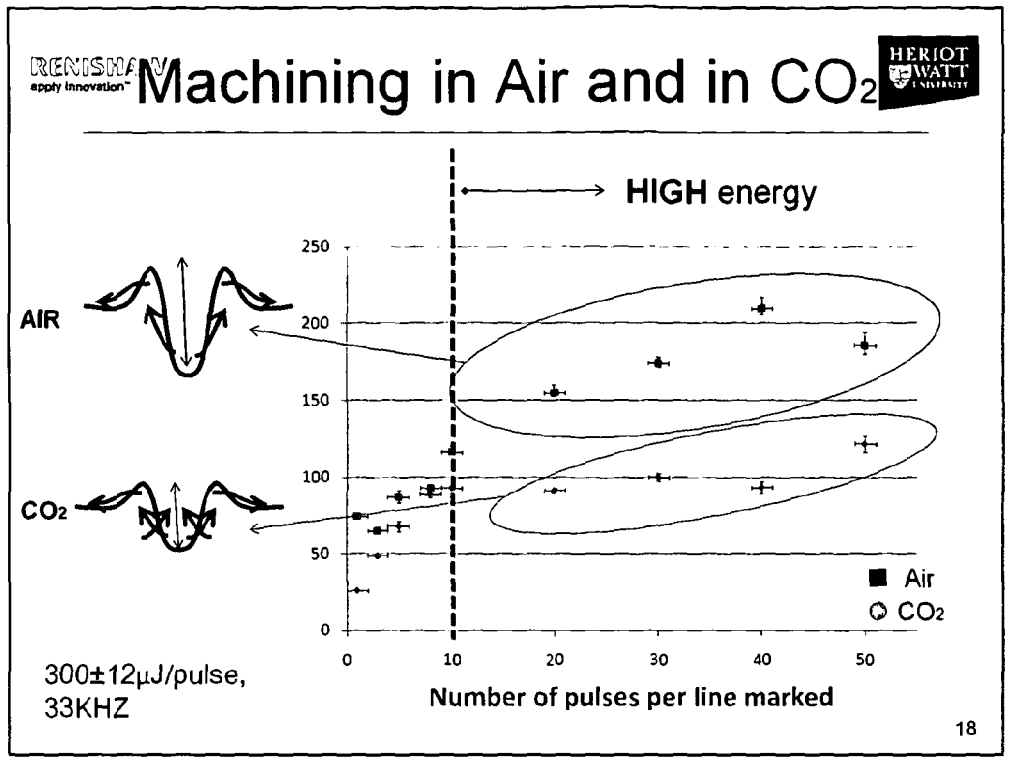

In a second set of experiments carried out in air and subsequently under $CO_2$, the number of pulses (of fixed pulse energy $E_p$ = 300mJ) used to mark a single line was increased sequentially. Results are presented in Figure 10.

The modulation depth (peak to trough) of the material processed in $CO_2$ reaches a plateau at ~100nm for a large number of pulses (>10 pulses), i.e. for large total line energies $E_T \geq 3mJ$, whilst the modulation depth of the lines marked in air keeps increasing. A possible explanation is that the heat build-up which occurs during a series of pulses results in the onset of vapourisation after 10 pulses; in the case of air this enhances the depression created by the high intensity region, whilst in $CO_2$ it counteracts it.

If the pulse energy is further increased in the $CO_2$ processing case, the profile of a single line created by a series of pulses changes from a protrusion to a dip (see figure 11), i.e. more similar to the case in air; hence in this regime vapourisation becomes dominant.

Conclusions

- Presentation of YAGboss: surface texturing of metallic surfaces
  - direct writing technique
  - takes advantage of thermally-induced hydrodynamic surface modifications.
  - exploited to produce a sinusoidal profile
  - can be applied to various materials that can reach homogeneous liquid phase under laser radiation

- Investigation of some of the physical phenomena involved in the YAGboss process.

- Technique used to create a reflective sinusoidal grating with a period of 8μm and depth of 200±20nm (integrated in high-precision optical position encoders)

Appendix 2

YAGboss – laser micro-sculpting of metal surfaces for the manufacture of high precision optical encoder scale
Paper M202

S. Giet[1], F. Albri[1], M. D. Kidd[2], J. D. Shephard[1], N. J. Weston[2], D. P. Hand[1]

[1] Heriot Watt University, Department of Physics, Edinburgh, EH14 4AS, Scotland, UK

[2] Renishaw plc, Edinburgh, EH14 4AP, Scotland, UK

Abstract

High-precision positioning is an important aspect of process control. In this context, high resolution positioning feedback provided by high accuracy optical position encoders (OPE) is an invaluable tool which is implemented on a wide range of automated systems where precise positioning is the key to successful applications or technology development. OPEs consist of two main elements: a scale and a read-head. Although OPE have been part of the industrial landscape for the last 30+ years, their current fabrication scheme is no longer in line with the requirements of increasingly more demanding applications such as electronic assembly or semiconductor manufacturing requiring nanometre resolution. Indeed, the mechanical embossing techniques traditionally used to manufacture the diffractive scales found in OPE are limited in resolution, whilst the alternative lithographic techniques are unsuitable for mass production and long scale lengths.

This paper introduces a novel laser-based high precision micro-sculpting technique for the development of diffractive scales. It focuses on improving the scale's resolution whilst retaining commercially-viable process rates to realise the production of 100s of meters of sinusoidal surface features, 200nm±10nm deep and 4μm±0.1μm wide. In this paper, we investigate how the characteristics of the generated surface features (shape, width, depth) depend on the combination of laser parameters and processing atmosphere. Samples of 8μm-pitch scales marked on stainless steel are assessed by metrology and in conjunction with a read-head to evaluate their efficiency.

Introduction

In a growing number of applications such as manufacturing or life science, process control is closely linked to quality output. It enhances process reliability, company credibility and provides a direct competitive advantage. Part of this process control in automated systems is provided by high performance and high accuracy motion systems and components.

High precision optical position encoders (OPE) are such devices. They provide reliable high-accuracy location feedback and contribute to the accuracy of automated precision positioning systems [1]. OPEs consist of two main components as shown in Figure 1: a diffractive scale working in reflection and a read-head. The read-head is composed of [2]:

- a light source producing incident rays on the scale;
- a set of two gratings; the index grating diffracts readable rays into fringes, and the analyser grating converts fringes into light modulations;
- an array of photo sensitive elements for converting the light modulations into a representative electrical signal.

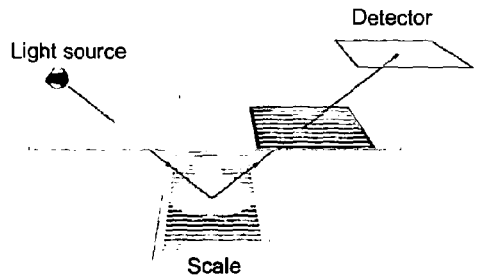

Figure 1: Schematic of an Optical Position Encoder (OPE).

These devices are facing the challenges of increasingly demanding applications such as laser systems for medical stent cutting, vacuum based spatial equipment assembly or electronics manufacturing. These applications typically call for nanometer resolution positioning. Current fabrication schemes for OPE scales are no longer in tune with these requirements. Based on expensive lithography techniques and inaccurate embossing methods, they respectively lack flexibility and resolution. For this reason, we propose a concept using a laser-based process for sub-micron texturing of metallic surfaces.

The YAGboss technique presented in this paper gets its name from the pulsed Nd:YAG laser used to sculpt and shape ('emboss') materials precisely on the surface of a metallic substrate, usually stainless steel. It is a direct write method that takes advantage of laser matter interaction phenomena and hydrodynamic surface effects to produce thin grooves required for the production of reflective gratings. These gratings are engineered to have a smooth sinusoidal profile. Our requirement is a grating with an 8µm period which can be used with a read-head light source emitting in IR at 830nm. The grooves need to be 200±20nm deep to exhibit maximum diffraction effects in the 1$^{st}$ order. This is achieved by machining juxtaposed lines using a laser line focus. A burst of typically 5 – 20 pulses is used to generate each line.

We expect that a number of successive physical phenomena are involved in the process of generating a single line, [3-7]:

1. local laser beam absorption at the surface of the metal;

2. local heating and heat propagation;

3. the metal surface at the point of incidence reaches its melting temperature;

4. melt front propagation;

5. development of surface tension variance across the meltpool due to temperature variance, and hence localised melt flow;

6. the metal surface reaches vapourisation temperature at the point of incidence;

7. formation of recoil pressure enhancing the surface tension effects and pushing the edges aside.

Clearly phenomena 1-5 could occur without 6 & 7, dependent on the intensity. In this paper we explore the relative importance of phenomena 5 and 7 in generating the required structure.

Experimental

Experiments were carried out using a JDSU Nd:YAG q-switched laser operating at 355nm. The pulse width is 35ns. A telescope is used to convert the 1.6mm diameter beam output from this laser into a 3mm diameter collimated beam. A cylindrical lens of focal length 40mm is then used to generate the required focus line, 4µm × 3mm, at the surface of the sample. The sample is positioned using a XYZ translation stage and moved across the focused beam in 8µm steps along the longitudinal axis. The translation stage has a precision accuracy of ~100nm.

The machining process is automated, with the triggering and motion system being centrally computer controlled. The maximum marking speed is currently limited by interface communication time.

Material one: martensitic spring steel

In this section, we report the results achieved with an 8 mm wide, 0.20 mm thick semi-rigid spring steel piece, tested in its as-received condition. The surface is a high quality rolled surface, with irregular longitudinal features along its pulling and rolling axis. The surface is lightly oiled after manufacture to avoid corrosion.

Figure 2: Surface map of a 7.8µm period grating machined with the YAGboss process on flexible steel tape, using 18 pulses of 750±20µJ energy, at 5kHz.

Figure 3 shows a typical sinusoidal profile achieved with the YAGboss process, with each groove machined using 18 pulses of 750±20µJ energy at a marking repetition rate of 5kHz.

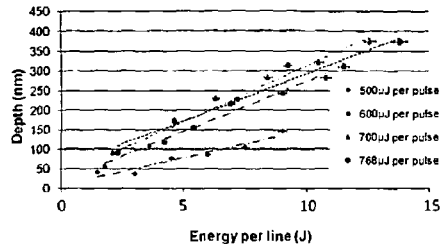

Figure 3: Variation of groove depth with the number of pulses used to mark a single line at a repetition rate of 5kHz on martensitic flexible steel tape.

The graph in Figure 3 shows the groove depth $d$ as a function of total energy $E_T = E_P N$ per line, for different pulse energies $E_P$ where $N$ is the number of pulses used. The depth $d$ has a roughly linear dependence in each case, albeit with slightly different gradients. This, together with the rather small magnitude of the depth achieved, suggests that the process involves mainly melting with little or no vapourisation. In other words, the shaping and formation of the grooves relies mainly on local convection fluxes and surface tension variance: once the material is locally heated and a melt pool is formed, the liquid material is pulled towards the edges of the laser illuminated region.

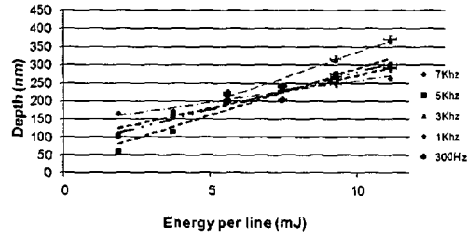

Figure 4: Variation of the depth of grooves marked using the YAGboss process on martensitic flexible steel tape for constant 600µJ/pulse at different repetition rates.

This is confirmed by the 3D image (Figure 2) acquired with a white light interferometer: this picture shows smooth and even grooves. Even in the case of lines marked at >700µJ/pulse at 5kHz repetition rate and with a large number of pulses, there is no trace of ejected or overflowing molten material at the edges of the markings which is usually a sign of excessive vapour recoil pressure [3, 8].

The graph plotted in figure 4 shows the variation of groove depth at a constant 600µJ pulse energy for different repetition rates. The pulse separation varies from 3.3ms at 300kHz to 0.1ms at 10kHz. It is clear that the repetition rate has little influence on the depth, which is proportional to the number of pulses used to machine a line. It is proposed that there is a spreading of the heat affected zone (HAZ) and of the molten pool as the number of pulses increases [8].

Material two: cold rolled austenitic-ferritic precision type 316 stainless steel strip mechanically polished Similar experiments were carried out using a rigid spar of stainless steel. Figures 5, 6 and 7 show the gratings achieved at a repetition rate of 5kHz with a pulse energy of 208±20µJ and a burst of 20 pulses. The grating shows a good homogeneous sinusoidal profile other than 2 deliberately missed lines (created to generate 'reference marks'). The graph of depth against energy per line presented in Figure 8 clearly shows two regimes. With a low energy pulse, the depth is only weakly (linearly) dependent on the energy per line. It is thought to be due to a combination of melting and surface tension effects.

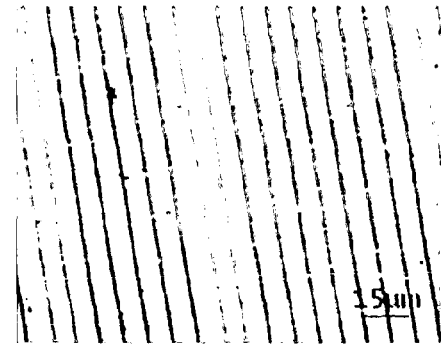

Figure 5: optical microscope image of a 8µm period grating YAGbossed on spar steel.

Figure 6: 8μm period sinusoidal grating machined on spar stainless steel using YAGboss. 20 pulses of 210±20μJ were used at a repetition rate of 5kHz. The profile shows 2 reference markers that were not laser processed.

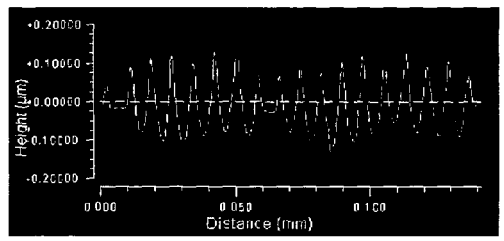

Figure 7: Sinusoidal profile of the YAGbossed spar stainless steel with 20 pulses and 210±20μJ/pulse @5kHz.

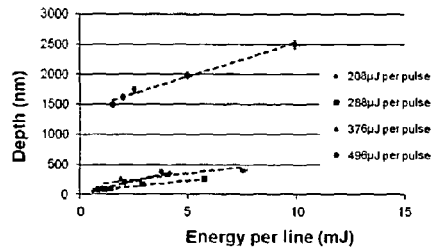

Figure 8: Variation of groove depth with the number of pulses used to mark a single line at a repetition rate of 5kHz on 316 stainless steel strip mechanically polished.

With a high energy pulse, the depth is much larger and its gradient with energy per line is much steeper. We postulate that the increased depth is due to the onset of vapourisation and hence significant vapour recoil pressure, whereas in the low energy pulse regime only the varying surface tension effects are significant.

Impact of processing atmosphere

To investigate further the relative importance of the surface tension effects and the recoil pressure, experiments were carried out with the sample under a flow of $CO_2$ gas at 15°C. Literature [7, 9] shows that $CO_2$ significantly influences the convection fluxes of molten metallic materials; indeed we would expect the material to flow towards the centre rather than towards the edges of the focused beam. We would expect the recoil pressure, by contrast, to always have the opposite effect.

Figure 9 shows the surface of a mechanically polished stainless steel spar sample marked with a line focus, under a blanket of $CO_2$ gas. A set of 10 pulses, each of energy 400μJ is used for each line. In contrast to the situation with processing in air, the intensity peak creates a protrusion (rather than a depression), confirming that with this pulse energy, surface tension (rather than recoil pressure) effects dominate. Furthermore, the lines processed under $CO_2$ are narrower than the lines generated in air. Unlike the processing in air where the molten material overflows towards the edges of the markings, the molten material in $CO_2$ atmosphere remains localised under the optical radiation.

Figure 9: YAGbossing of spar stainless steel under $CO_2$ atmosphere. Each line is machined with 10 pulses of $E_T$=400μJ pulse energy.

In a second set of experiments carried out in air and subsequently under $CO_2$, the number of pulses (of fixed pulse energy $E_p$ = 300μJ) used to mark a single line was increased sequentially. Results are presented in Figure 10.

The modulation depth (peak to trough) of the material processed in $CO_2$ reaches a plateau at ~100nm for a large number of pulses (>10 pulses), i.e. for large total line energies $E_T \geq 3mJ$, whilst the modulation depth of the lines marked in air keeps increasing. A possible explanation is that the heat build-up which occurs during a series of pulses results in the onset of vapourisation after 10 pulses; in the case of air this enhances the depression created by the high intensity region, whilst in $CO_2$ it counteracts it.

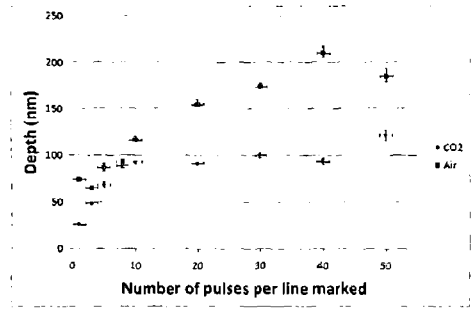

Figure 10: YAGbossing of lines on stainless steel under air and $CO_2$ atmospheres for a pulse energy of 300µJ.

If the pulse energy is further increased in the $CO_2$ processing case, the profile of a single line created by a series of pulses changes from a protrusion to a dip (see figure 11), i.e. more similar to the case in air; hence in this regime vapourisation becomes dominant.

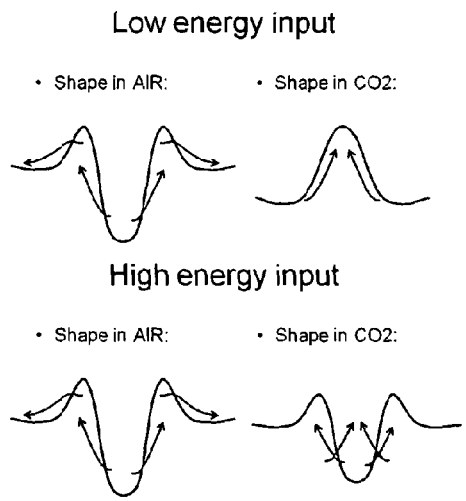

Figure 11: Summary and schematics of transversal views of a YAGbossed line under $CO_2$ and in air at low (top) and high (bottom) energies.

Discussion

The YAGboss process is based on a combination of surface tension and recoil vapour pressure above the material. This means that molten material is displaced towards the edges of the line-shaped mark. In the experiments presented in this paper, the machined target is not actively cooled. As marking occurs and the spar is moved across the beam path, the substrate, initially at room temperature, sees its local temperature varying as the material is being marked. This complicates the description of the phenomena involved as most thermophysical parameters like thermoconductivity, density of fluid, surface tension and viscosity are temperature dependent.

The experimental results presented in this paper show that for the typical feature depths required for optical encoder scale manufacture (~200nm), that surface tension variations and the resultant Marangoni convection [7] is the dominant process.

This YAGboss technique can be successfully applied on a variety of materials that present a stable liquid homogeneous phase as a result of laser beam processing. It has also been shown to work with ~1µm nickel and silver layers coated on spar stainless steel that microprocessing ~4um wide and ~400nm deep lines was achievable at high processing speed [10].

Conclusions

In this paper we have investigated some of the physical phenomena involved in the YAGboss process. This technique is used for accurately texturing the surface of a metal to create a reflective sinusoidal grating with a period of 8µm and depth of 200±20nm. These gratings will be integrated in high-precision optical position encoders.

YAGboss is a direct writing technique that takes advantage of thermally-induced hydrodynamic surface modifications. It can be applied to various materials that can reach homogeneous liquid phase under laser radiation. These surface deformations, borne out of a combination of convective fluxes due to surface tension variations with substrate temperature (Marangoni effects) and recoil vapour pressure, are exploited to produce a sinusoidal profile.

This process has the potential to manufacture OPE scales at the commercially viable process rates required; a rate of >45mm/min (with 35pulses×~300μJ energy per line) should be feasible with a laser of 10W average power and repetition rate of >30kHz, allowing appropriate time (1ms) for positioning of the 8μm-period scale substrate.

Bibliography

[1] D. F. Horne, *Photomasks, Scales and Gratings*. 1983: Adam Hilger Ltd, Bristol.

[2] A. Ellin and J. Henshaw, *Method and apparatus for scale manufacture without substantial removal material*. 2009, Renishaw Plc.

[3] G. Lallemand, G. Jacrot, E. Cicala, and D.F. Grevey, *Grooving by Nd:YAG laser treatment*. Journal of Materials Processing Technology, 2000. 99: p. 32-37.

[4] J. Qi, K.L. Wang, and Y.M. Zhu, *A study of on the laser marking process of stainless steel*. Journal of Materials Processing Technology, 2003. 139: p. 273-276.

[5] N. Pierron, P. Sallamand, and S. Mattei, *Numerical modeling of molten pool formation during an interaction of a pulsed laser (Nd:YAG) with an aluminium sheet*. Proceedindgs of the COMSOL Multiphysics User's conference 2005, 2005.

[6] J.M. Jouvard, A. Soveja, and N. Pierron, *Thermal modeling of metal surface texturing by pulsed laser*. Proceedindgs of the COMSOL Multiphysics User's conference 2006, 2006.

[7] S. Iu, H. Fujii, and K. Nogi, *Marangoni convection and weld shape variations in Ar-O2 and Ar-CO2 shielded GTA welding*. Materials science and engineering A, 2004(380): p. 290-297.

[8] R. Schuster and M. Dinkelmann. *Observation of evaporating surfaces and vapour flows at capillary geometries*. in *Conference on Lasers in Manufacturing*. 2009. Munich.

[9] E. Nagels, J.R. Dufloub, and J. Van Humbeecka, *The influence of sulphur content on the quality of laser cutting of steel*. Journal of Materials Processing Technology, 2007. 194: p. 159-162.

[10] S. Giet, A. Ellin, C. Michakis, J. Parry, M. Kidd, J.D. Shephard, D. P. Hand, and N. Weston, *Novel laser-based machining process for high precision optical position encoders*. Proceedindgs of the 5th International WLT Conference on Lasers in Manufacturing - 2009, 2009.

Meet the Author(s)

Stéphanie Giet graduated in 2008 with a PhD in physics from the Institute of Photonics of the University of Strathclyde. She is a Research Associate in the Applied Optics and Photonics Group in Heriot Watt University. Her research primarily involves high power laser marking to suit various commercial applications. Her current interest includes the development of technology for the rapid manufacture of high precision optical encoders in joint collaboration with industrial partners.

Frank Albri studied Physics at University of Karlsruhe (Germany) from 2005 to 2008. In September 2008, he directly entered the 5th year of the MPhys course in Optoelectronics and Lasers at Heriot-Watt University and graduated in July 2009. He is currently studying towards a PhD in "High-precision laser micro machining" within the Applied Optics and Photonics Research Group. The research concentrates on different time regimes used for micromachining: from nanosecond to femtosecond pulses with an emphasis on picosecond laser pulses.

Matt Kidd received a BEng (Hons) in Mechanical Engineering from the University of Edinburgh in 1995 and a PhD in Mechanical Engineering from Heriot-Watt University in 2000. He joined Renishaw plc in 1999 and has worked as both design engineer and project manager on a range of novel metrology projects. In 2006 he worked as a project engineer for Stirling Medical Innovations developing an assay for cardiac diagnostics in the home. Returning to Renishaw plc in 2008 he now leads the mechanical design development for an encoder scale.

Jonathan Shephard received the BA degree in Engineering from Cambridge University, UK, in 1994, the MSc (Eng.) degree in 1996 and the Ph.D degree in 2000, both from the University of Sheffield, UK. In 1994 he joined Pilkington plc, UK, working within R&D after which he returned to study for his MSc (Eng) and PhD within the Department of Engineering Materials, University of Sheffield. At Sheffield his work concentrated on the development of mid-IR transmitting optical fibres and waveguides. In 2003 he joined the Applied Optics and Photonics Group at Heriot-Watt University, Edinburgh, UK, working on the development of novel microstructured fibres and applications of high power lasers for processing, monitoring and control. Now a Lecturer and RCUK Academic Fellow at Heriot-Watt University, he is currently working on developing technologies for integrating high power laser into novel manufacturing processes.

Nick Weston received a BSc in Engineering (1990), and Ph.D in Engineering Design (1994), both from the University of Durham, UK. He joined Renishaw Plc in 1997 and became General Manager of their Edinburgh operation in 2003. This team undertakes long term development of innovative product and process technology in industrial metrology, optics and precision motion systems. He is a member of the IEEE, a chartered mechanical engineer and a Fellow of the IMechE.

Duncan Hand is Professor of Applied Photonics at Heriot-Watt University; he is also currently Head of Physics. His research interests span a range of applications of high power lasers, primarily in manufacturing and sensing. His research in manufacturing includes laser micro-joining, laser precision machining, and fibre optic delivery of high power laser light; and is a key component of the JWI, an Innovative Manufacturing Research Centre based at Heriot-Watt, which recently received £7.2M funding from the UK Engineering and Physical Sciences Research Council.

The invention claimed is:

1. A method of forming a diffractive optical device, the method comprising:
applying a laser beam to a plurality of target areas located at different positions on a surface of a substrate so as to selectively melt material of the surface; and
controlling at least one of atmospheric conditions at the surface and composition of the surface such that the application of the laser beam causes a melt pool at each of the plurality of target areas to exhibit a surface tension gradient, with higher temperature areas of the melt pool having a higher surface tension than lower temperature areas of the melt pool, that results in a transfer of molten material to build up profiles on the surface, the profiles forming a diffractive structure of the diffractive optical device.

2. The method according to claim 1, comprising controlling the atmosphere at the surface such that the higher temperature areas of the melt pool have a higher surface tension than the lower temperature areas of the melt pool.

3. The method according to claim 2, wherein the controlling of the atmosphere comprises providing an atmosphere at the surface rich in a gas, relative to the concentration of the gas in air, that causes at least one of oxidation, phosphorus evaporation, carbide formation and chromium migration.

4. The method according to claim 2, wherein the controlling of the atmosphere comprises providing a $CO_2$-rich atmosphere, relative to the concentration of $CO_2$ in air, at the surface during the application of the laser beam to the surface.

5. The method according to claim 1, comprising providing material at the surface having a composition such that the higher temperature areas of the melt pool have a higher surface tension than the lower temperature areas of the melt pool.

6. The method according to claim 5, comprising treating the surface of the substrate with a surface active agent that reacts with material of the substrate to provide the composition.

7. The method according to claim 6, wherein the surface active agent causes at least one of oxidation, phosphorus evaporation, carbide formation and chromium migration.

8. The method according to claim 5, wherein the composition comprises one or more elements from groups 13, 14, 15 and 16 of the periodic table.

9. The method according to claim 8, wherein the composition comprises one or more elements from periods 2 and 3 of the periodic table.

10. The method according to claim 8, wherein the material comprises a high period metal and the composition comprises one or more elements from periods 4 and 5.

11. The method according to claim 5, wherein the composition comprises one or more elements selected from calcium, sulphur, manganese, silicon, titanium, zirconium, aluminium, magnesium, nitrogen, oxygen and phosphorus.

12. The method according to claim 5, wherein the material has a selected oxygen or sulphur content.

13. The method according to claim 1, comprising controlling at least one parameter of the laser beam to obtain the transfer of material.

14. The method according to claim 13, wherein the at least one parameter comprises at least one of intensity, wavelength, pulse length, and pulse repetition time.

15. The method according to claim 1, wherein, for at least one of the plurality of target areas, the laser beam has a greater intensity at a first part of the at least one target area than at a second part of the at least one target area.

16. The method according to claim 15, wherein the laser beam has an intensity above a threshold intensity thereby to reduce the transfer of material to the first part of the at least one target area in comparison to the transfer of material to the second part of the at least one target area.

17. The method according to claim 16, wherein the laser beam has an intensity above the threshold intensity at the first part of the at least one target area and an intensity below the threshold intensity at the second part of the at least one target area.

18. The method according to claim 16, wherein the threshold intensity is an intensity at which radiation of the laser beam ablates the surface.

19. The method according to claim 16, wherein the threshold intensity is a minimum intensity for which radiation of the laser beam acts to oppose the transfer of material due to the surface tension gradient.

20. The method according to claim 16, comprising applying both the laser beam and a further laser beam to the at least one target area, wherein the laser beam has an intensity above the threshold intensity and the further laser beam has a maximum intensity below the threshold intensity.

21. The method according to claim 20, wherein the method comprises:
applying one of the laser beam and the further laser beam to the at least one target area;
allowing the surface at the at least one target area to at least partially solidify; and
applying the other of the laser beam and the further laser beam to the at least one target area.

22. The method according to claim 21, wherein application of the further laser beam to the at least one target area fills in with material at least a portion of the profile of surface material formed by application of the laser beam, or vice versa.

23. The method according to claim 22, wherein application of the laser beam forms a two peaked profile of surface material and application of the further laser beam subsequently at least partially fills a well between the two peaks, or application of the further laser beam forms a single peaked profile of surface material and application of the laser beam subsequently at least partially broadens the single peak.

24. The method according to claim 20, wherein the laser beam and the further laser beam have parameters that are controlled such as to produce a profile of material at the at least one target area that has a flat top.

25. The method according to claim 1, comprising applying a further laser beam to a plurality of further target areas, each of the further target areas being at a respective, different position on the surface, thereby to create a further melt pool at each further target area and build up the profiles of the diffractive optical device.

26. The method according to claim 25, wherein the method comprises applying the laser beam to the plurality of target areas in a sequence, wherein at least some of the target areas that are spatially adjacent to each other on the surface are temporally non-adjacent in the sequence.

27. The method according to claim 1, comprising applying the laser beam to at least one target area of the plurality of target areas a plurality of times thereby to build up material at the target area.

28. The method according to claim 27, further comprising:
controlling the atmosphere at the surface such that the higher temperature areas of the melt pool have a higher surface tension than the lower temperature areas of the melt pool; and
varying a composition of gas above the surface, so that the composition of the gas is different for at least some of the times that the laser beam is applied to the at least one target area than for at least some other of the times that the laser beam is applied to the at least one target area.

29. The method according to claim 1, wherein the method comprises blocking an outer part of the laser beam from reaching the surface.

30. The method according to claim 1, wherein the method comprises passing the laser beam through a beam shaper before applying it to the surface.

31. The method according to claim 30, wherein the beam shaper is configured to redistribute power from higher intensity parts of the laser beam to lower intensity parts of the laser beam.

32. The method according to claim 1, wherein the laser beam has an intensity such as to provide transfer of material due to the surface tension gradient without removal of material from the substrate.

33. The method according to claim 1, wherein the diffractive optical device comprises at least one of a metrological device, a phase scale, a hologram and a diffraction grating.

34. The method according to claim 10, wherein the high period metal is a metal selected from the group of silver, tungsten, platinum and gold.

35. The method according to claim 6, wherein the surface active agent comprises one or more elements selected from calcium, sulphur, manganese, silicon, titanium, zirconium, aluminium, magnesium, nitrogen, oxygen and phosphorus.

36. The method according to claim 25, comprising applying the further laser beam to the plurality of further target areas in a sequence, wherein at least some of the further target areas that are spatially adjacent to each other on the surface are temporally non-adjacent in the sequence.

37. The method according to claim 25, comprising applying the further laser beam to at least one further target area of the plurality of further target areas a plurality of times thereby to build up material at the at least one further target area.

38. The method according to claim 37, comprising:
controlling the atmosphere at the surface such that higher temperature areas of the further melt pool have a higher surface tension than lower temperature areas of the further melt pool; and
varying a composition of gas above the surface, so that the composition of the gas is different for at least some of the times that the further laser beam is applied to the at least one further target area than for at least some other of the times that the further laser beam is applied to the at least one further target area.

* * * * *